(12) United States Patent
Macy et al.

(10) Patent No.: US 12,105,499 B2
(45) Date of Patent: Oct. 1, 2024

(54) METHOD AND APPARATUS FOR POSITIONAL REFERENCE IN AN AUTOMATED MANUFACTURING SYSTEM

(71) Applicant: 3D Systems, Inc., Rock Hill, SC (US)

(72) Inventors: William D. Macy, Woodland Park, CO (US); Ryan Luke Alejo, Colorado Springs, CO (US); Nathan D. Eversole, Colorado Springs, CO (US)

(73) Assignee: 3D SYSTEMS, INC., Rock Hill, SC (US)

( * ) Notice: Subject to any disclaimer, the term of this patent is extended or adjusted under 35 U.S.C. 154(b) by 258 days.

(21) Appl. No.: 17/957,148

(22) Filed: Sep. 30, 2022

(65) Prior Publication Data
US 2023/0109495 A1     Apr. 6, 2023

Related U.S. Application Data

(60) Provisional application No. 63/251,630, filed on Oct. 2, 2021.

(51) Int. Cl.
*G05B 19/00* (2006.01)
*B25J 9/16* (2006.01)
(Continued)

(52) U.S. Cl.
CPC ........ *G05B 19/4099* (2013.01); *B25J 9/1692* (2013.01); *B25J 19/02* (2013.01);
(Continued)

(58) Field of Classification Search
CPC ...... G05B 19/4099; G05B 2219/49007; G05B 2219/50008; G05B 2219/50031;
(Continued)

(56) References Cited

U.S. PATENT DOCUMENTS 6,629,011 B1    9/2003  Calderon et al.
7,601,650 B2 *  10/2009 Stevens ............. C04B 35/62884
                                                     438/787

(Continued)

FOREIGN PATENT DOCUMENTS

| CN | 105150531 A | 12/2015 |
| CN | 207535316 U | 6/2018 |
| CN | 209738293 U | 6/2019 |

OTHER PUBLICATIONS

Annex to Form PCT/ISA/206 Communication Relating to the Results of the Partial International Search Report for PCT Application No. PCT/US2022/045325 dated Jan. 23, 2023 (48 pages).
(Continued)

*Primary Examiner* — Ian Jen

(57) ABSTRACT

Applied within an automated robotic manufacturing system that includes additive manufacturing capabilities, methods and enabling devices are disclosed for achieving precise multi-dimension positional alignment among a plurality of diverse took that are involved in collaboratively constructing a solid object. The enabling devices according to various embodiments include an automatically deployed contact sensing probe and a tool center point sensor that detects contact with tools in multiple axes. At least one disclosed method advantageously utilizes both sensing devices in complement.

14 Claims, 16 Drawing Sheets

(51) Int. Cl.
  *B25J 19/02* (2006.01)
  *B29C 64/209* (2017.01)
  *B29C 64/393* (2017.01)
  *B33Y 50/02* (2015.01)
  *G05B 19/4099* (2006.01)

(52) U.S. Cl.
  CPC .......... *B29C 64/209* (2017.08); *B29C 64/393* (2017.08); *B33Y 50/02* (2014.12); *G05B 2219/49007* (2013.01)

(58) Field of Classification Search
  CPC ....... G05B 2219/50137; G05B 19/4015; B25J 9/1692; B25J 19/02; B29C 64/209; B29C 64/393; B29C 64/118; B29C 64/227; B33Y 50/02; B33Y 10/00; B33Y 30/00
  See application file for complete search history.

(56) References Cited

U.S. PATENT DOCUMENTS

| | | | |
|---|---|---|---|
| 7,680,555 | B2 | 3/2010 | Dunn et al. |
| 9,205,690 | B2 | 12/2015 | Leavitt et al. |
| 10,399,326 | B2 | 9/2019 | Jorgenson et al. |
| 10,994,462 | B2 | 5/2021 | Kemperle et al. |
| 2009/0133169 | A1* | 5/2009 | Mirkin .................. B01L 3/0255 850/55 |
| 2020/0361155 | A1 | 11/2020 | Jones et al. |
| 2021/0008790 | A1 | 1/2021 | Han et al. |

OTHER PUBLICATIONS

English Translation of Chinese Application No. CN207535316U, received with the Results of the Partial International Search Report for PCT Application Application No. PCT/US2022/045325 dated Jan. 23, 2023 (8 pages).

English Translation of Chinese Application No. CN209738293U, received with the Results of the Partial International Search Report for PCT Application Application No. PCT/US2022/045325 dated Jan. 23, 2023 (11 pages).

English Translation of Chinese Application No. CN105150531A, received with the Results of the Partial International Search Report for PCT Application Application No. PCT/US2022/045325 dated Jan. 23, 2023 (13 pages).

PCT International Search Report for PCT Application No. PCT/US2022/045325, mailed Mar. 22, 2023 (8 pages).

PCT International Written Opinion for for PCT Application No. PCT/US2022/045325, mailed Mar. 22, 2023 (13 pages).

* cited by examiner

METHOD AND APPARATUS FOR POSITIONAL REFERENCE IN AN AUTOMATED MANUFACTURING SYSTEM

RELATED APPLICATIONS

This application claims the benefit of priority under 35 U.S.C. 119(e) to U.S. provisional patent application No. 63/251,630, which was filed on Oct. 2, 2021 and is incorporated by reference herein.

FIELD OF THE INVENTION

This disclosure relates to achieving precise calibration of the positions of multiple robotic tools that move within a common build space of an automated manufacturing system.

BACKGROUND

In the field of additive manufacturing, a common technique involves building a solid object wherein materials such as heated thermoplastics are extruded from a nozzle in successive layers upon a starting surface or 'build plate'. The relative position and speed of motion between the nozzle and build plate is controlled by electrical motors which are precisely controlled by a motion control computer. Generally, the process of building a solid object begins with moving the nozzle to within close proximity to the build plate and then moving the nozzle parallel to the build plate as material is extruded from the nozzle. This motion in parallel with the planar build is typically regarded as being in 'X' and 'Y' directions according to a Cartesian coordinate system. Ideally, softened plastic forced out of the nozzle tip as it moves adheres to the build plate and solidifies to form a 2D pattern of solid material exactly corresponding to where the nozzle has traveled. After completing all of the material deposition that corresponds to the first layer of the build, the nozzle and build plate are moved further apart (in the so-called 'Z' direction) and a second layer of material is similarly deposited atop the first layer. This process may be repeated numerous times (though each successive layer may exhibit a somewhat different pattern according to the outer contours of the object to be formed) eventually forming an object having substantial dimension in all three directions, X, Y and Z. Successive layers are most often deposited using a uniform layer height, which corresponds to the Z-axis distance by which nozzle and build plate become further separated with the completion of each layer.

In such a process, proper adhesion and formation of the first layer of extruded material is literally the foundation for a successful object build. Assuring a successful first layer involves careful control of such factors as build plate and extruder temperatures, extrusion rate and initial distance between the nozzle and build plate. The optimum parameters vary widely depending on what material is being extruded to form the part and what build plate surface material is to serve as the substrate for the build.

The flatness of the build plate and the consistency of nozzle-to-build plate distance (parallelism) over the range of X-Y motion are both crucial. Even a slight change (such as a fraction of a millimeter) in distance as the nozzle moves across the build surface can cause extruded material to form incorrectly in places. Where the nozzle is too far away, the extruded material can completely fail to adhere and simply follow the nozzle around while forming non-descript blobs and strings of material. In the other extreme, the nozzle may be pressed so close to the build plate that extruded material is splattered outward as it leaves the nozzle tip or may even be blocked from extruding if the nozzle is forced into contact with (or gouges into) the build surface. Accordingly, maintaining a well-controlled distance between nozzle and build plate is imperative for assuring safe operation and successful builds.

To promote adhesion of the critical first layer, it is common practice to start the first layer at a specific distance between nozzle and build plate surface that is different from the incremental Z-axis displacement used for all other layers. To mitigate the effects of possible unevenness in a build plate surface, a larger distance (such as 50% greater) may be employed in conjunction with an increased rate of material extrusion per unit of X-Y travel. This approach results in a larger and often less consistently formed bead of extrude material on the initial layer but goes a long way towards assuring a robust first layer upon which to build the rest of the object.

An alternative approach is also applied in cases where the surface evenness is not the primary issue and, instead, the first layer suffers from inherently poor chemical or molecular adhesion between the extruded material and the build plate material. Although adhesion-promoting surface treatments offer some improvement, a situation of marginal adhesion can also be improved by running the nozzle closer to the build plate for the first layer, helping 'drive' the extrudate into more intimate contact with the build surface or helping the relative motion draw the extrudate out of the nozzle.

In all of the cases described above, the vertical (Z-axis) positioning of the nozzle relative to the build plate must be precisely established during initializing of the motion control mechanism, regardless of how the motion control is designed and operated. As with most multi-axis motion control systems (except those with absolute position encoders), most 3D printers go through an initialization process upon each power up and before extrusion starts, initially perform a 'homing' procedure to reliably and consistently establish the starting positions of moving parts of the system. Once the so-called 'zero position' is detected, any motion controlling signals, such as impulse sequences to stepper motors (open loop) or servo with position encoder (closed loop), allow a controller to thereafter keep track of the moment-by-moment absolute positions of the controlled motion axes for as long as the motion control logic program continues to run.

This is especially necessary for systems that use stepping motors in an open loop implementation in which relative position throughout the build is tracked based on keeping count of pulses after a reference starting position has been established at the outset of the build. In such systems, no ongoing confirmation of positions is performed during the build.

In the motion control mechanism of an average 3D printer, the homing of the Z-axis establishes an initial distance relationship between the nozzle and the build surface so that the nozzle distance can be precisely controlled thereafter, especially for the first layer. This homing typically utilizes a 'microswitch' which utilizes an electrically conductive flexing spring to assure a 'snap action' actuation with minimal electrical bounce (mechanical hysteresis) and very consistent position detection along a single axis.

While this suffices in many applications, advanced techniques in industrial printers gives rise to a new set of challenges unmet by this common technique.

In particular, newer comprehensive manufacturing systems may employ both material-adding and material-removing tool heads moving within a common build space and acting cooperatively in the construction of a solid object. An example of a material-adding tool head would be a thermoplastic extrusion nozzle as discussed above. A given manufacturing system may employ multiple extrusion heads, each of which may be either of the pellet-fed or filament-fed types. An example of a material-removing tool head would be a milling or drilling head having a sharp rotating bit, or other such tool heads that separate material from a solid object being manufactured.

Whereas a material-adding tool head may deposit an object in a rough form and with some excess material, the material-removing tool may subsequently perform machining to, for example, cut a roughly formed part to a final precise dimension or refine the finish of the part, such as at a gasket surface, where the finished part must form a smooth, tight seal against another part when in use. Material-removal capabilities may also complement material-additive ones by removing a supportive web that was initially constructed by the additive process but is no longer needed later in the build after the additive build progresses far enough that a once-supported member becomes self-supporting. Furthermore, in situ material removal may intervene in such a manner at opportune times during the build and may reach some surfaces that would be occluded after the additive build is completed. Drilling, milling, abrasion or other processes may also be used to create more precise hole positions and outer surface finishes than is achievable by the additive process alone.

The advent of combined material-adding and material-removing implements in the course of a single build process gives rise to a crucial need for very precise calibration of the three-dimensional locations among all of the moving components within the build space of the manufacturing system. As both the 'additive' extrusion and 'subtractive' tool heads must act upon the same object being formed within the build space, a precise alignment among these divergent types of tool heads must be achieved to assure, in coordination with one another, that each acts upon the workpiece (the object being constructed) exactly where expected. In a finished object constructed by such a system, it would ideally be possible for an extruder-deposited surface to seamlessly adjoin a tooled surface without any obvious evidence of misalignment between the material-adding and material-removing implements—and for any combination where there may multiple additive tools or multiple removal tools.

BRIEF DESCRIPTION OF THE DRAWINGS

Various exemplary embodiments are illustrated by way of example, and not by way of limitation, in the figures of the accompanying drawings, in which like reference numerals refer to similar elements and in which.

DETAILED DESCRIPTION

Figure 1:
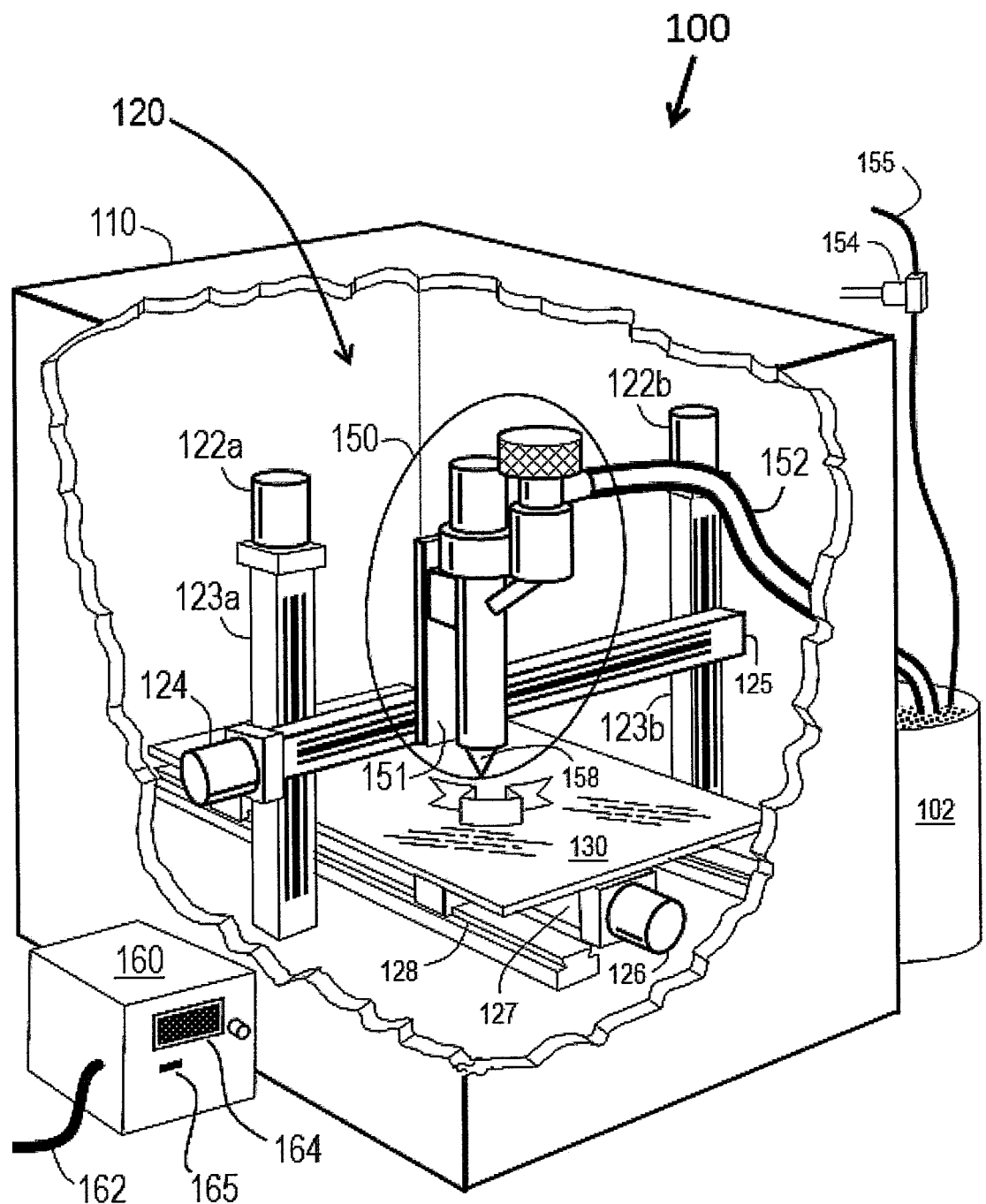
FIG. 1 is an overall pictorial of an automated manufacturing system that employs a pellet-type extruder head housed enclosed within an enclosure.

Various non-limiting embodiments of the present disclosure will now be described to provide an overall understanding of the principles of the structure, function and use of the apparatuses, systems, methods, and processes disclosed herein. One or more examples of these non-limiting embodiments are illustrated in the accompanying drawings. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of principles of the present teachings by way of exemplary apparatuses, devices, systems and methods described herein. None of the features or components shown in the drawings or discussed below should be taken as mandatory for any specific implementation of any of the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that, unless otherwise specified or required by context, any explicit or implicit ordering of steps performed in the execution of a method does not imply that those steps must be performed in the order presented but instead may be performed in a different order or in parallel.

In general, it will be apparent that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. As needed, software and hardware to implement the embodiments based on the present description may be readily developed with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

Certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, USB flash drives or hard disk drives. A computer-readable medium can also include memory storage that is physical, virtual, permanent, temporary, semi-permanent and/or semi-temporary.

A 'computer', 'computer system', 'host', "server," or "processor" can be, for example and without limitation, a processor, microcomputer, microcontroller, programmable logic controller, minicomputer, server, mainframe, laptop, or any other programmable device. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

Although a controller or a programmable logic controller (PLC) may be referred to singularly herein, it should be understood that the functionality under discussion, such as that of a programmable logic controller (PLC) may be hosted as but one process in a computing platform that is performing other tasks or serving in other roles. The PLC may be hosted within a virtual machine environment, for example. Furthermore, any role of a controller or PLC discussed herein may also be distributed logically or physically. An action called for as part of a process may involve cooperative action among multiple processors, such as a 'high-level' computer providing a responsive user interface that communicates with an embedded processor that is dedicated to sustained real-time control of motion. Some or all of the processing steps may occur among one or more processors that are remote from the point of application, meaning that they are communicating with, but not physically collocated or integrated with, the motion control system or other components described below. To be clear, although many aspects described below refer to a 'PLC', the logic to be implemented is not confined to being programmed in the style of the IEC 61131 standard promulgated by the International Electrotechnical Commission. Furthermore, the electrical signal levels associated with typical PLC implementations may be relatively easily adapted to interface with, or be emulated by, other types of computing platforms.

A 'computer' or 'processor' acting upon programmed instructions that perform steps of a process that are internal (such as storing information in a memory or performing calculations) or external (such as by sending signals that cause specific movements of a motion control system) can be said to be 'configured to' or 'adapted to' perform the actions called for in the process by virtue of executing the programming instructions provided to it.

FIG. 1 depicts an enclosed additive manufacturing system 100. System 100 is shown to comprise a motor-driven multi-axis motion control system 120 which controllably moves extruder head 150 relative to build plate 130. Build plate 130 may refer to either a direct surface for initiating additive builds or may be topped with an intermediary sheet of material or a chemical coating. Accordingly, build plate 130 may also be referred to herein as a 'build surface' especially in reference to the topmost surface of the build plate plus any intermediary materials placed on top of it. The motion control componentry combined with extruder head 150 constitute an additive manufacturing system, that is, a form of 3D printer. Multi-axis motion control system 120 as shown creates movement along three orthogonal axes in an arrangement known as a Cartesian coordinate system wherein any point within the build space is referenced by a unique triplet of scalar values corresponding to displacement along three mutually orthogonal axes.

Extruder head 150 is shown to be attached to a carriage 151 that is controllably moved along the long axis of transverse beam 125 by the rotation of the shaft of an X-axis motor 124. Typically, beam 125 will comprise one or more linear bearings facilitating the smooth movement of carriage 151 parallel to the long axis of beam 125. Furthermore, beam 125 may house a lead screw (not distinctly visible in the diagram) which is coupled to carriage 151 by a precision nut, fixed within the beam 125 by rotary and thrust bearings and coupled to the shaft of X-axis motor 124. The rotation of the shaft of X-axis motor 124 may rotate the lead screw which, in turn, will cause carriage 151 to move closer to or further away from motor 124 in a controlled manner. X-axis motor 124 is often a stepping motor but may also be an AC or DC servo motor with a shaft position encoder and/or tachometer operating in a closed-loop control mode to facilitate moving to very precise positions. Many such arrangements of motors, lead screws, bearings and associated components are possible and are commonly practiced.

Whereas the arrangement of motor 124 and beam 125 accomplish controlled movement of the extruder head 150 in what may be termed the horizontal X-axis in the print-space coordinate system, motors 122A, 122B and their respective columns 123A, 123B may use a similar arrangement of linear guides, bearings and lead screws such that Z-axis motors 122A, 122B controllably move extruder head 150 in a vertical direction, that is, closer to or further away from build plate 130. More specifically, beam 125 may be attached to carriages (hidden) that couple to lead screws within columns 123A and 123B. As Z-axis motors 122A and 122B rotate their respective lead screws in synchrony, the entirety of beam 125, X-axis motor 124 and extruder head 150 are caused to move upward or downward.

To accomplish yet another motion of build plate 130 relative to extrusion head 150, a third motor, which may be referred to as Y-axis motor 126 may act upon a lead screw 127 to which the build plate 130 is coupled. The rotation of the shaft of motor 126 controls the position of build plate 130. Build plate 130 may be supported by, and may slide or roll along, linear bearing rails such as rail 128.

It should be understood that the arrangement of motors, bearings and such depicted in FIG. 1 is merely one example of achieving controlled relative motion between extruder head 150 and build plate 130 such that an object may be formed by the extrusion of materials through nozzle 158. Various other arrangements are common and equally suitable as an embodiment in which the present teachings may be applied. For example, in some arrangements, the build plate may move in two horizontal axes while the extruder head may move only vertically. Alternatively, the build plate may only move vertically while an extruder head moves in two horizontal axes. In yet other arrangements, an extruder head may be coupled to a motor driven gantry that accomplishes motion of the extruder head in three (or more) axes while the build plate remains stationary. The present teachings are equally applicable to a wide variety of motion control arrangements, including those just mentioned as well as so-called 'Core XY', 'H-bot' and 'delta' arrangements.

In addition, it should be understood that, for simplicity, FIG. 1 excludes many fasteners, brackets, cables, cable guides, sensors and myriad other components that may be employed in the manufacture of such systems but which are not essential for explaining the principles of the present invention nor for describing the best mode thereof. Where linear guides and lead screws have been described, it should be understood that the present teachings are not limited to being applied to machines that use such mechanisms and that, for example, belt driven systems and gear driven systems are equally suitable for use and susceptible to the challenges that the present teachings address.

Extrusion head 150 is described in further detail below. In summary, the role of extrusion head 150 is to receive plastic in pellet form driven by bursts of air through a feed tube 152 and to melt the plastic and drive it out of the end of nozzle 158 in a continuous stream. Typically, plastic pellets are stored in a large external pellet reservoir 102 and provided to the extruder head 150 in small increments as needed. A detector (to be shown and described below) included with the extruder head 150 determines when additional pellets are needed and electrically controls the actuation of an air valve 154 which switches on a momentary burst of compressed air as provided by compressed air inlet 155 driving pellets from reservoir 102 towards extruder head 150.

To accomplish the formation of a solid object in three dimensions upon the build plate 130 from extruded materials emanating from the tip of nozzle 158, a control box 160 is provided with electronics, such as a microprocessor and motor drive circuitry, which is coupled to the X, Y and Z motors as has been described above, as well as to numerous sensors and heating elements, in the system 120, some of which will be described further below in connection with FIG. 2. Electronics within control box 160 also control an extruder motor, to be described below. Some examples of suitable control electronics which may operate within control box 160 are the RAMBo™ control board manufactured by UltiMachine running Marlin firmware and so-called 'Smoothie boards' executing open-source Smoothieware firmware.

A wide variety of 3D printer control boards may be used. The primary role of such controller boards is to interpret sequential lists of positional commands, such as so-called G-code files and to output signals that drive the motors to implement the commanded movements. A G-code data file, or the like, describing the coordinate movements necessary to form a particular object may be supplied to the controller through connection of the controller to a wired data communications network via, for example, TCP/IP communications through an Ethernet connection or via a wireless network connection, such as 'WiFi' or IEEE 802.11 connection. A G-code file (or a data file, such as a file in STL format from which a G-code file may be prepared) may also be supplied on a removable flash memory card, such as an SD card, which may be inserted at SD card slot 165 on control box 160.

For providing a human-accessible control interface, essentially all of the available control boards support an LCD display and user interface 164, as is shown to be a part of control box 160 in FIG. 1. The electrical power to drive the control box 160 and the motors sensors and heating elements of system 120 comes from a connection to electrical power lines 162.

Build plate 130 is preferably heated to a controlled temperature, most commonly using electrical resistance heating elements (not visible in the diagram) which may be mounted under the bed and thermally coupled thereto. For this purpose, it is common to use a heating mat made of high-temperature-rated silicone rubber that has electrically conductive paths embedded within and is adhered to the bottom of the build plate. A temperature sensor, such as a thermistor is typically included to provide feedback to a proportional-integral-derivative (PID) controller which maintains a set build plate temperature by controlling the application of heating current to the heating mat. Such elements for heating the build plate are commonplace and need not be further described here.

The temperature within enclosure 110 may be elevated over typical room ambient temperature by the addition of yet other heating elements (not shown) or simply by the heat incidentally dissipated from build plate 130. With a suitably insulated enclosure 110, heat from build plate 130 may be fully sufficient to heat the interior of the enclosure to beneficial levels by convection alone.

Figure 2:
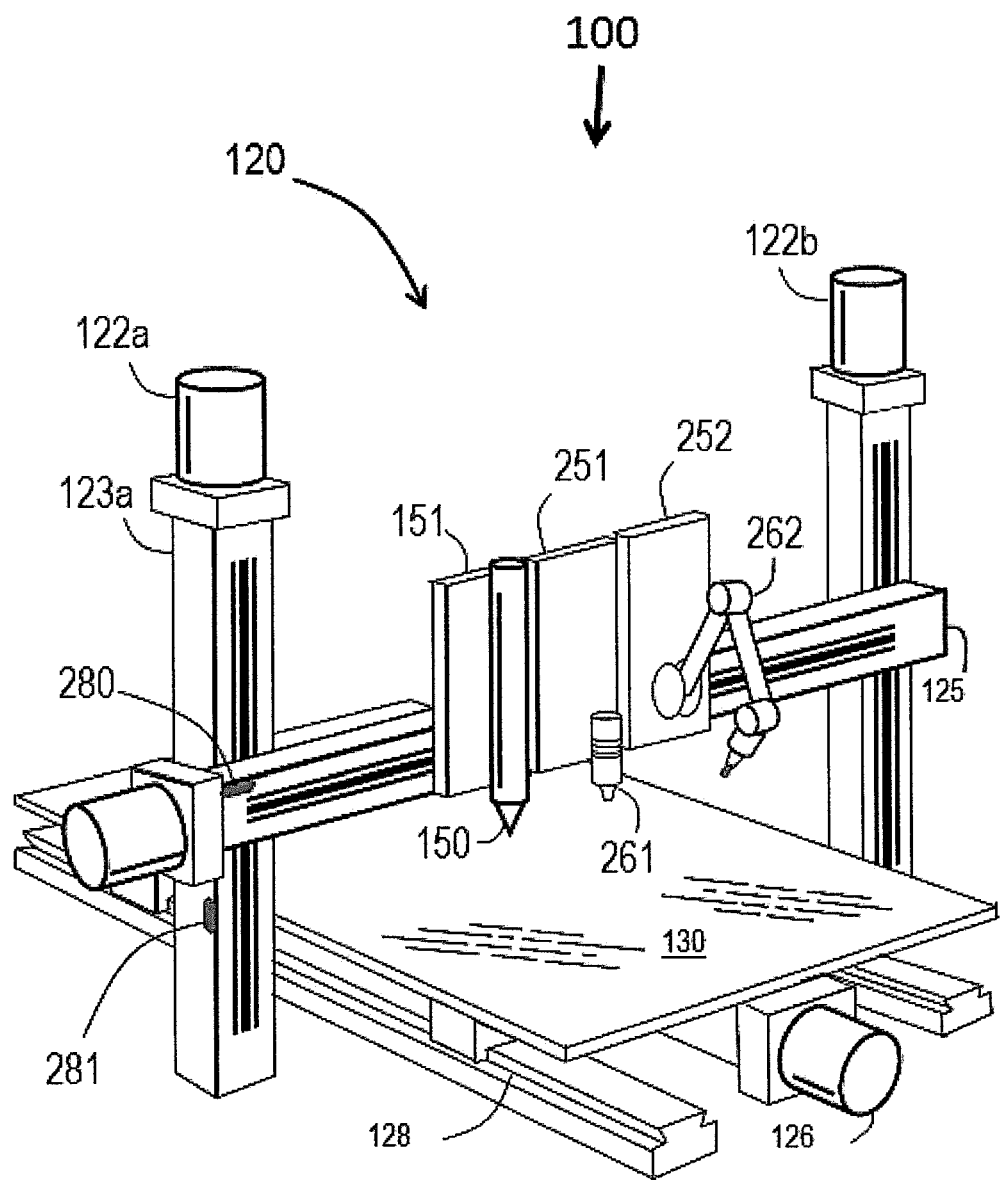
FIG. 2 is a simplified pictorial of an automated manufacturing system showing a plurality of diverse tool heads operating within a common build space.

FIG. 2 presents a view of a manufacturing system, simplified in comparison with FIG. 1 by having the enclosure and other components removed from view to facilitate explanation of an example context wherein the present teachings may be advantageously applied. For convenience, system 100, labeled above as an 'additive manufacturing system', is preserved as such in FIG. 2 but it must be pointed out that system 100 has been augmented with other tool heads to constitute a system that is at least 'additive' in nature but may optionally apply other, possibly non-additive, processes as well. Henceforth, system 100 may be referred to as an instance of a more general 'automated manufacturing system' or a variation upon an 'automated additive manufacturing system.'

Representing more recent systems, FIG. 2 depicts three tool head assemblies coupled to transverse beam 125, one of those being pellet extruder head 150, by attachment to carriage 151, as was introduced in FIG. 1. Additionally, FIG. 2 shows a filament extruding head 261, attached to carriage 251, as another material-adding mechanism. Yet another tool head, multi-axis machining head 262, is coupled through carriage 252 to serve as a material-removal head operable within the same build space, and capable of acting upon the same constructed objects, as the two additive tool heads 150 and 261. Machining head 262 may have many axes of motion and may provide, at its distal end, a turning spindle or chuck that holds a cutting tool such as a drill bit, router bit or end mill. It is in this context that the example implementations and descriptions of operation are set forth below but it must be understood that many variations are possible in the configuration of the manufacturing system, which exhibit, or exacerbate, the aforementioned challenges in multi-head and mixed additive/subtractive systems. For example, while three tool heads happen to be shown in FIG. 2, two additive and one subtractive, any number and mixture of tool heads may be realized, subject only to the practical limitations of the motion system and the space available. Further, although the three tool heads shown can be configured such that all three carriages 151, 251, 252 either travel together as driven by motor 124 or are combined into a single carriage. It is possible to build a system wherein each carriage moves independently by different mechanisms or at separate times by a shared mechanism. Through a mechanical or magnetic latch (not shown), each of carriages 151, 251, 252 might be selectively coupled and decoupled to a leadscrew or belt inside of transverse beam 125 at various times to either be driven along the transverse bar 125 or to remain 'parked' at either end of the travel range, allowing motor 124 to selectively drive only one of the carriages at any given time. Another alternative arrangement may involve having the tool heads travel along separate transverse beams or be carried as payloads at the distal ends of several independent robotic arms. A single robotic arm, typically having multiple linkages connected by articulating joints and capable of program-controlled movement to specific coordinates within the build space, may be equipped to latch onto a specific tool head and apply its action to an object being built. Throughout all of these possible variations, the present teachings address the challenge of achieving and maintaining precise registration among a multiplicity and diversity of tool heads.

Figure 3:
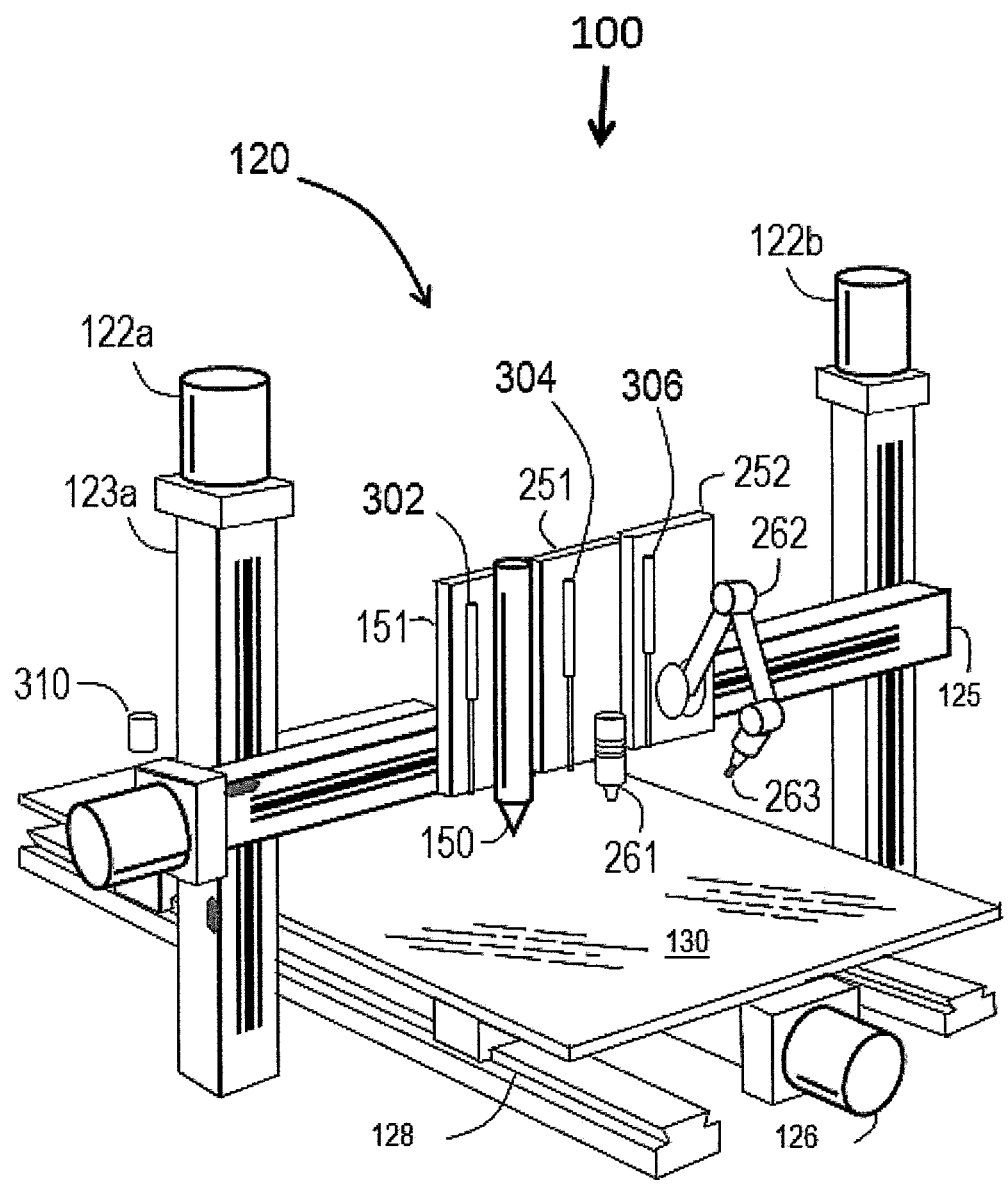
FIG. 3 is a simplified pictorial resembling FIG. 2 but with additional implements in accordance with example embodiments of the present teachings.

FIG. 3 is similar to FIG. 2, but continues further to depict possible locations for additional components in accordance with some example implementations of the present teachings. In particular, each carriage 151, 251, 252 is shown to include, alongside the respective extrusion or machining apparatus, an 'Auto-Z probe' as will be explained shortly. In summary, each Auto-Z probe can be actuated under program control to extend downward beyond the tool with which it is paired. As will be explained, each Auto-Z probe can be deployed to detect contact when a force from another surface acts in line with its vertical shaft.

Aside from the Auto-Z probes, FIG. 3 depicts a 'tool center point sensor' ('TCP sensor') 310 which is preferably positioned to be accessible by each one of the installed tool heads (or at least able to be put in such position when being used for positional calibrations.) TCP sensor 310 appears in FIG. 3 to be roughly centered in the X axis (the axis of motion parallel with transverse beam 125) and at one extreme of travel in the Y axis, assuming sensor 310 moves with the build plate in this specific example.

To be clear, FIG. 3 merely provides a reference overview to facilitate the explanations that follow and is not intended to limit the quantity, manner or location of where the Auto-Z and tool center point sensor components may be usefully deployed. Other attachment means and placements for coupling sensor 310 within the build space are possible.

Figure 4A:
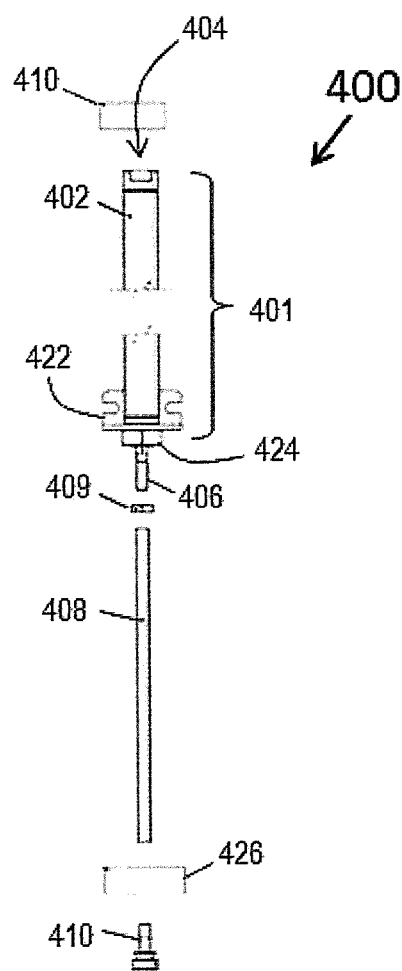
FIG. 4A depicts the assembly of an actuator-deployed contact probe in accordance with example embodiments of the present teachings.
Figure 4B:
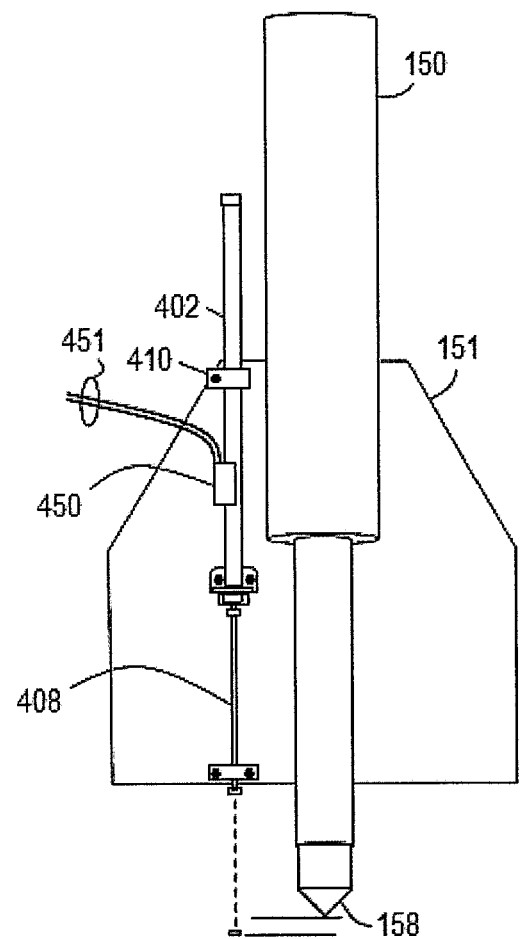
FIG. 4B depicts a manner of attaching an actuator-deployed contact probe alongside a tool head in accordance with example embodiments of the present teachings.

FIGS. 4A-4B shows an example construction and placement of an Auto-Z probe in accordance with preferred embodiments of the present teachings.

More specifically, FIG. 4A is an exploded view showing the individual parts of an example pneumatically-deployed AutoZ-Probe assembly 400. Compared to electric means, a pneumatic implementation lessens concerns over reliability at high temperatures within heated enclosures and near heated components. Nevertheless, the present teachings should not be construed to be limited in terms of employing pneumatic actuation or only providing linear motion.

The Auto-Z probe comprises a pneumatic actuator 401, such as Model M-027-NR made by Bimba Ltd. which exhibits a 7-inch overall stroke. When air or other gas is supplied under pressure through port 404 on the upper end of actuator 401, shaft 406 is thrust downward out of actuator cylinder 402. Pneumatic cylinder 401 typically comprises an internal bore and a movable piston that slides within the bore and forms an essentially airtight seal with the walls of the bore. Shaft 406 is connected to the piston and is driven outward as pressurized fluid or gas enters the opposite end of the cylinder. More generally, actuator cylinder 402 may be regarded as an outer housing whereas the piston inside may be regarded as an inner member moved by influx of a fluid into the outer housing under pressure. According to the customary design of pneumatic actuator 401, shaft 406 protrudes from cylinder 402 somewhat even when not pressurized. This stub end of shaft 406 is threaded and is attached to a sacrificial extension tube 408, which is internally threaded to mate with external threads of shaft 406. Tube 408 is threaded onto shaft 406 along with nut 409 which tightens against the top of tube 408 to secure it at a fixed location at the lower end of shaft 406. Thereafter, shaft 406 and tube 408 move up and down as a single integral assembly whenever pressurized gas enters actuator cylinder 402.

The lower end of tube 408 is capped with thumbscrew 410, which provides an interchangeable tip to make contact with other surfaces. Thumbscrew 410 may be formed of metal and/or plastic, for example, and may offer a slightly curved or convex shape to ensure a consistent region of contact when approaching other surfaces, as will be described below.

The remainder of assembly 400 involves various mounting hardware for affixing actuator 401 to a tool head carriage and maintaining alignment of actuator 401 and tube 408, withstanding high incidence of vibrations and sudden jarring motions of the attached carriage. As shown, mounting hardware includes mounting bracket 422 (Bimba Model D-775) through which the threaded end of cylinder 402 is inserted and secured using nut 424. Due to the lateral inertial forces experienced in this application, an additional bracket 420 is fabricated and used to secure the top end of the actuator cylinder 402. Finally, another bracket 426 is added to keep the lower end of tube 408 in alignment and assure consistent positioning of the probe tip when it is deployed downward. Bracket 426 may optionally be fitted with a bushing or linear bearing to transfer contact to tube 408.

FIG. 4B shows how an example carriage 151, bearing a pellet extruder assembly 150, may be fitted with Auto-Z probe assembly 400 in accordance with a non-limiting example embodiment. Mounting brackets 410, 422, 426 are fastened to carriage 151, generally with screws or bolts, such that assembly 400 is substantially vertically disposed and situated alongside, and parallel to, the respective tool or extruder mechanism borne by the carriage. As a further consideration in designing and positioning Auto-Z probe assembly 400, the thumbscrew capped lower tip of tube 408 should extend below and beyond the respective tool, in this case the tip of nozzle 158, when deployed downward for probing. Accordingly, the vertical positions of the mounting brackets may need to be adjusted or accommodated by correctly placed mounting holes within carriage 151.

Where the tool attached to the carriage exhibits its own motion, as is the case with a multi-axis machining head, the placement of the Auto-Z probe should be with respect to a nominally known reference position of the tool tip, such as a 'home' position for the machining head. In any case, at the time the probe is to be deployed for detecting contact with surfaces beneath the carriage, the motion system of the machining head should ensure that the tool tip and other mechanisms of the machining head remain elevated above the level of the probe tip.

Where several tool heads are deployed at the same time, as was depicted in FIG. 3, it is preferable that each Auto-Z probe attached to one of the carriages be positioned so that that it extends below ALL of the applicable tool tips when it is lowered to a probing position. In accordance with a preferred embodiment, when a selected one of the Auto-Z probes is lowered, that probe tube should momentarily become the lowest protruding member from the collection of carriages and implements riding along transverse beam 125. This tenet facilitates the overall process of calibration to be described later below.

It is worth noting that FIG. 4B introduces one additional item that was not accounted for in FIG. 4A, namely reed switch 450. Reed switch 450 is attached to the side of actuator cylinder 402 to sense the position of a piston inside actuator 401. Reed switch 450 provides a signal, such as a change in electrical continuity between wires 451, as a function of whether the piston (and, hence, actuator shaft 406) inside the cylinder is at a particular position. Reed switch 450 is preferably adjusted so that, when tube 408 is lowered, any upward displacement of tube 408 and thumbscrew 410 due to contacting a surface results in a change in electrical continuity across wires 451. Reed switch 450 may be, for example, Model RHT from Bimba Ltd. which is suitable for use at elevated ambient temperatures commonly present inside enclosure 110.

In general, probe assembly 400, or a subset of parts thereof, may be said to constitute a contact probe comprising a contact-sensing element (such as switch 450) coupled to move with an associated tool head by virtue of being mounted to the same carriage 151 as shown in FIG. 4B.

Figure 5:
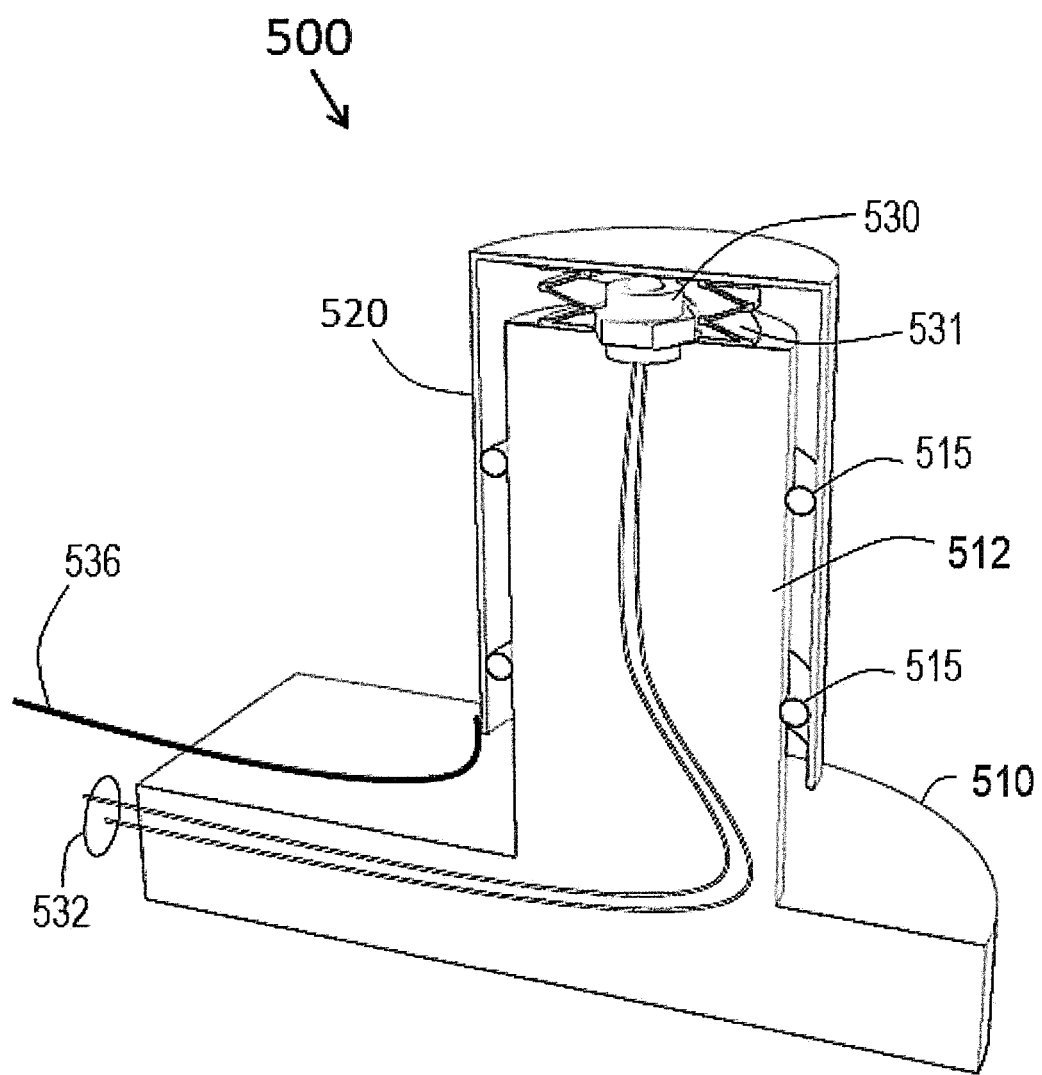
FIG. 5 is a diagram depicting, as a cutaway view, one example structure of a contact sensing probe in accordance with example embodiments of the present teachings.

FIG. 5 shows an example construction of a positional referencing sensor assembly 500, a form of which was introduced as TCP sensor 310 earlier. Because of one mode of use that will be described below, sensor assembly 500 may be referred to herein as a 'tool center point' or 'TOP' sensor, for convenience. In summary, sensor assembly 500 as shown is designed and configured to detect contact with other objects in two ways. Contact with an external object approaching from above sensor assembly 500 is detected by overcoming a light spring pressure and actuating a small electrical switch. Contact with an external object approaching from the side of sensor assembly 500 is detected by electrical continuity between the object and the outer shell of the sensor assembly. Both of these techniques will now be explained. Much of the structure and selection of parts is driven by the need to reliably operate at high temperatures inside enclosure 110.

In FIG. 5, sensor assembly 500 is shown (in cross section) to comprise, in terms of gross structure, a mounting arm 510 and an upright post 512, which is preferably cylindrical. These may be formed as a single piece or comprise an upright post 512 that threads into a hole in mounting arm 510. Upright post 512 may be clamped or fastened in some fashion to mounting arm 510. Upright post 512 may be mostly hollow or substantially solid and may or may not be equipped with a flange that facilitates mounting to mounting arm 510. Many variations are possible while still achieving equally effective results and the example shown in FIG. 5 should not be construed to limit many possible designs that adequately enable the operating principles taught herein.

An electrical switch 530 is shown to be installed at the upper end of upright post 512, preferably centered with the long axis of post 512. One suitable switch for high temperature use is STM82A-HT2 made by Metrol Co., Ltd. Also placed at the top of post 512 and positioned to surround the protruding switch 530 is wafer spring 531. Spring 531 may be, for example, similar to Part No. 1561T49 available from McMaster-Carr Supply Company. A hollowed shell 520 is shown to be inverted and placed over upright post 512. Shell 520 is preferably cylindrical, preferably of a precisely known diameter, and preferably made of metal, such as aluminum, to conduct electricity, the significance of which will be explained below. Other electrically conductive materials or composite assemblies, such as metal plated polymers or metal coated insulators might also be used. It is contemplated that shell 520 may be created in other shapes having known dimensions but the rotational symmetry of the cylindrical shape simplifies processes or reduces the likelihood of error in some of the procedures explained elsewhere herein.

Shell 520 is preferably lightweight and principally rests upon spring 531 without actuating switch 530 when at rest. The stiffness of spring 531, the mass of shell 520 and the position of switch 530 may be selected and adjusted in concert to assure that the weight of shell 520 is adequately opposed by the spring when at rest, yet a small external force applied downward to the top of the shell will actuate the switch and change the electrical continuity measurable through wires 532 connected to switch 530. In this manner, the assembly explained thus far provides remote sensing of relatively low-force contact by any object to the top of sensor assembly 500 or more specifically upon shell 520. Spring 531 serves as a force-applying member to counteract the weight of shell 520 and to prevent that weight alone from actuating switch 530. Other compressible components, such as elastomers, alternatively shaped springs or other force-applying devices, such as linear motors, magnets or electromagnets might be adapted for use in this capacity. In any case, switch 530 or the like acts as a contact sensing element and it may likewise be said, by extension, that sensor 500 is a 'contact sensing element' by virtue of this ability to detect contact directed from above.

Shell 520 is kept centered on upright post 512 and out of electrical contact with upright post 512 by the use of elastomeric O-rings 515, which are selected and placed to allow shell 520 to move up and down freely while allowing for negligible movement from side-to-side. In an alternative embodiment, other devices, such as conventional metallic linear bearings, might be used to keep shell aligned and capable of vertical motion, as long as an electrically insulative component is present somewhere to electrically isolate the shell from the grounded metal framework of the system 100. Some alternatives for preserving electrical isolation of the sensor shell 520 include insulating mounting arm 510 from the remainder of the framework, constructing post 512 to be made of, or coated with, an insulating material. An insulative sleeve or bushing may suffice to keep shell 520 separated from post 512 while allowing for some vertical movement that allows switch 530 to function. Another technique might involve insulating the upright post 215 wherever it attaches to mounting arm 510 by using insulated ('dielectric') stand-offs and washers around each of a plurality of fasteners. A signal wire 536 connects to shell 520 to provide for remote sensing of electrical contact with other objects, such as extrusion nozzles and end mills.

Figure 6:
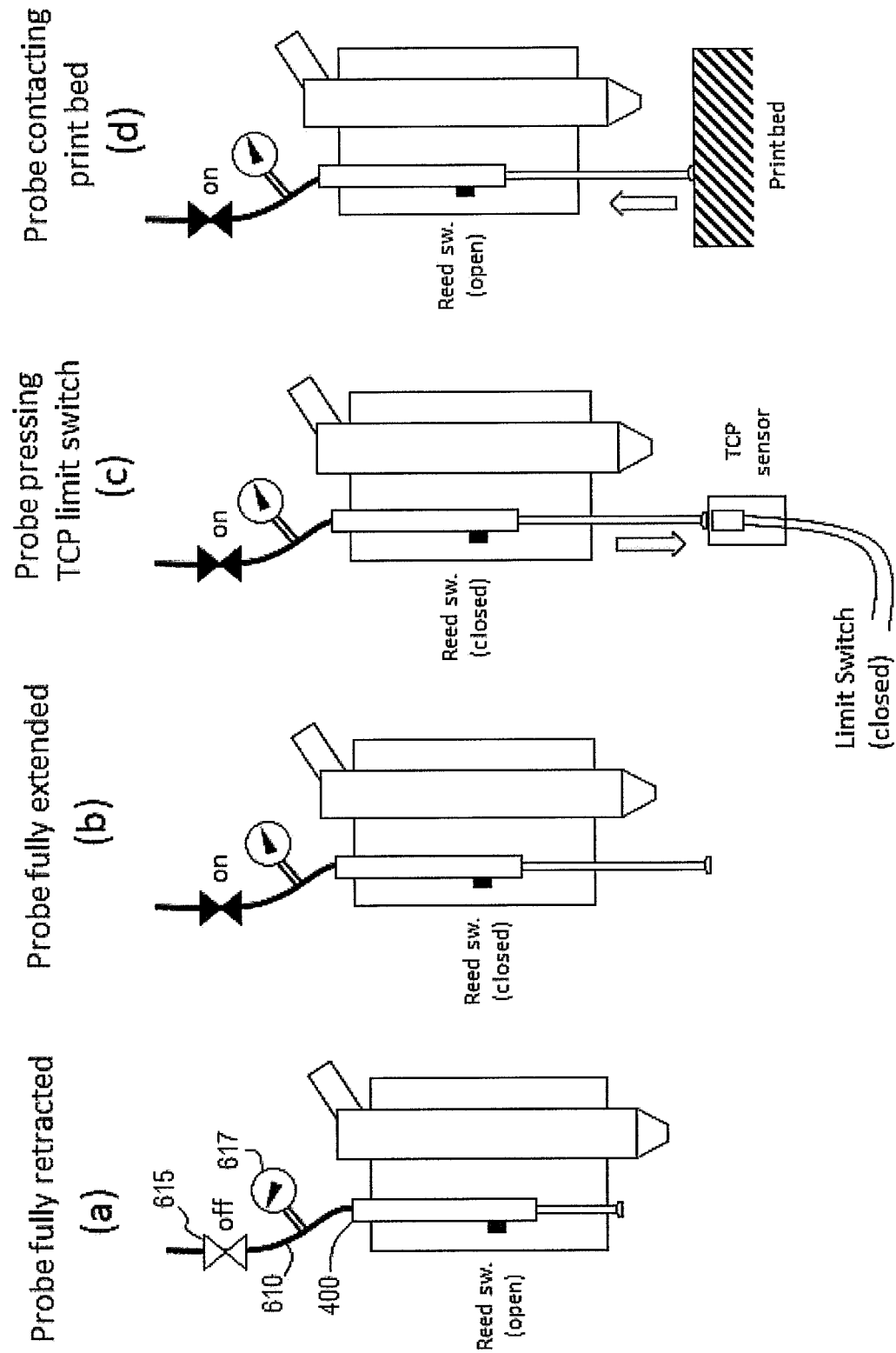
FIG. 6 is a conceptual diagram to show four different situations involving an actuator-deployed contact probe being utilized in accordance with example embodiments of the present teachings.

FIG. 6 depicts several conditions under which an Auto-Z probe 400 and a TCP sensor 500 are brought into operation. Under condition (a), Auto-Z probe 400 (shown attached to carriage plate 151 which also bears a pellet-fed extruder head 150) is shown to be connected by a hose 610 to a source of pressurized gas (not shown) through a solenoid valve 615. A digital pressure gage 617 is also shown coupled along hose 610 for monitoring the actuation pressure applied to deploy Auto-Z probe 400. Note that, because the same source of pressure may be routed to multiple Auto-Z probe actuators which are individually deployed by other such solenoid valves, gage 617 may be connected before the solenoid valve 615 to monitor a manifold pressure that is common across all the probe actuators within a given system 100. Pressure gage 617 preferably provides an electrical signal, indicative of the detected pressure conditions, for use by a data processor, as will be explained.

Condition (a) represents the 'normal' circumstance wherein no calibration activities are under way and the respective tool head (extruder head 150) is either idle or is actively extruding material to form a part, with the Auto-Z probe retracted as not to interfere with the build process nor impede any flow of cooling air or cover gas being directed towards the nozzle or workpiece.

Condition (b) shows the Auto Z probe as having been extended downward or 'deployed'. As mentioned before, the tip of the probe extends below the nearby tool or nozzle tip. The lowering of the probe tip to this position is accomplished by opening solenoid valve 615 (in turn, by application of an electrical signal from a computer or the like) so that pressurized gas enters the actuator cylinder and forces downward its interior piston, along with the probe tube. This condition may exist in preparation for 'probing', that is, slowly lowering the tool head in the Z direction while monitoring for contact of some nature.

Condition (c) represents bringing the lowered probe into contact with the top of the TCP sensor in accordance with a procedure that will be outlined in connection with process 800.

Condition (d) shows the lowered probe coming into contact with the bed or build surface in accordance with a procedure that will be outlined in connection with process 800.

Figure 7:
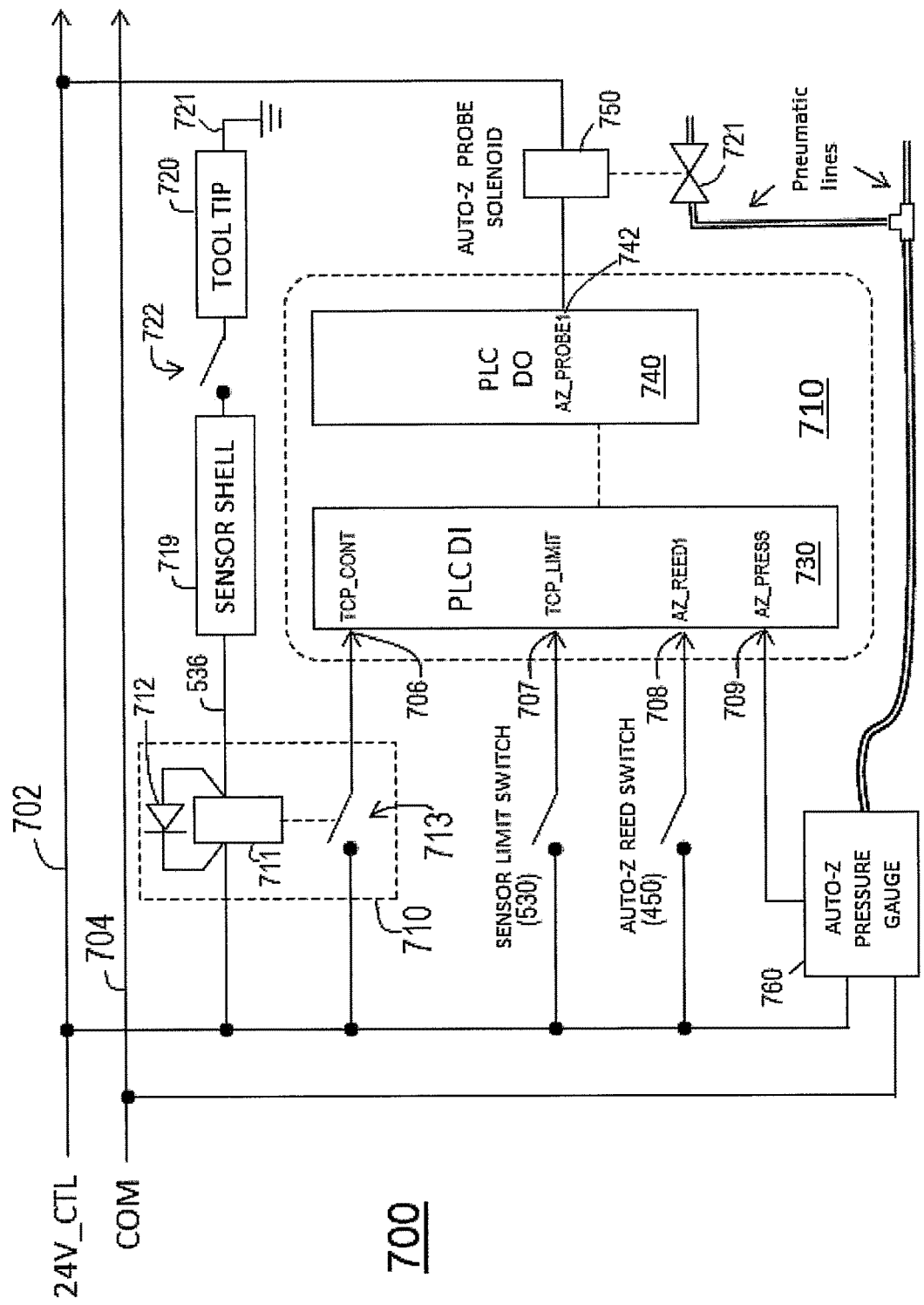
FIG. 7 is a schematic depicting electrical connections of a controller to sensors and actuators in accordance with example embodiments of the present teachings.

FIG. 7 presents a schematic 700 to show how various switches and actuators may be connected to provide inputs and outputs to a controller, such as a computer or a programmable logic controller (PLC) 710. Within PLC 710, I/O connections are shown as a bank of digital inputs 730 and digital outputs 740. In some implementations, these inputs and outputs may be directly compatible with 24 VDC. In other implementations, a controller serving in the role of PLC 710 may support TTL or CMOS signal levels, but it should be understood that these may be adapted by other interface circuitry (not explicitly shown) to accept other input signal voltages and to properly source and sink higher output currents as needed to operate in the context shown. Electrical supply line 702 is shown at a potential of 24 VDC with respect to a common (COM) or ground line 704, though other supply voltages may certainly be used depending on what is compatible with the other components within schematic 700 to be described next. Any of the functions described below in terms of relays may be virtualized or emulated by general-purpose computing devices.

Throughout this disclosure, numerous switches (switch 530 and reed switch 450) are shown as electrical switches by way of example, but the present teachings are not confined to electrical contacting switches, per se. As appropriate, these types of switches may alternatively well be optical in nature, using the interruption or establishment of an optical path that is detected by simple optical sensor and presented to controller 710 as an electrical signal. An interferometer or etalon may be used to achieve extreme sensitivity and precision. Alternatively, switch 230 may employ a magnetic-based principle, as with a Hall effect switch or a reed switch. Still other alternatives to simple electrical contacts include a strain gage couped to amplification and signal conditioning circuits, or capacitive- or field-sensing transducers. Subject to whether such devices are compatible with the elevated temperatures in a particular instance, the present teachings do not strictly preclude these or other alternatives.

Furthermore, where inputs to PLC 710 are shown in FIG. 7, it may be appropriately said that a controller, in whatever form and whether interrupt-driven or by polling inputs, 'receives' or 'processes' or 'detects' such signals, corresponding to executing instructions within the processor to (a) update a value in a memory location that represents the input state to a software process, or (b) start a process, or (c) cause a branch in execution flow within the processor.

Referring to the topmost 'circuit', block 719 labeled as 'SENSOR SHELL' corresponds to the TCP sensor's electrically conductive shell 520 described earlier. Signal wire 536 connects to one coil terminal of electromechanical relay 710. The other coil terminal of relay 710 is connected to supply line 70 and a transient suppression diode 712 is connected across the coil with the cathode being on the 24 VDC-connected terminal. When connected in this manner, contact between shell 520 any electrical conductor that is connected to 'common' or ground line 704 (which may be equivalent to chassis or earth ground) will energize the relay coil 711. One such path to ground may be the tip of an extruder nozzle or a machining bit that is connected to ground via contact with a grounded carriage, extruder body, drill chuck or other implements. These are represented by 720 labeled as 'Tool Tip' which is depicted by an explicit ground connection 721. Most parts of system 100 are inherently likely to be grounded but explicit grounding connections are also put in place to assure grounding on moving assemblies (especially as a return path for significant DC currents supplied to some moving electronics) and to bypass lubricated bearings and such where constant electrical continuity is not guaranteed. Grounding of tool heads is safer and far easier to achieve than providing for electrical isolation of a nozzle tip or machining tool tip. The use of intervening relay 710 allows for protecting input 706 from having a 'long antenna' exposure to potential electrostatic discharges, induced currents and incidental contact with other voltage carrying implements that may be in use within enclosure 110. Furthermore, relay 710 reverses the sense of the detection so that an affirmative continuity is reflected as a positive-going signal to input 706. Relay 710 also ensures significant current-handling ability through its contacts in case other relay-based logic needs to be connected in line with that branch. Relay 710 is preferably a fast-acting electromechanical relay. Alternatively, another type of component may be used in some instances, such as a solid-state relay, an optocoupler, or a PNP transistor circuit, to name a few.

The gap between block 719 and block 720 is depicted to be effectively the same as an electrical switch. When a grounded tool tip (block 720) contacts the sensor shell (block 719), a current path from 24 VDC to ground is set up through relay coil 711. The operation of relay 710 closes contacts 713 which connects 24V to input 706 of PLC 710, signifying that electrical continuity to ground has been detected at shell 520. Within the processing environment of PLC 710, the input state provided to input 706 may be known as, for example, 'TCP_CONTINUITY'.

As another circuit branching from supply line 702, limit switch 530 (introduced earlier) is shown to be connected between supply line 702 and input 709 of PLC input bank 730. Within the processing environment of PLC 710, this signal may be labeled, for example, 'TCP_LIMIT'.

Shown below that, another switch, representing one of perhaps several Auto-Z reed switches 450, is shown to provide a signal to input 708 of PLC bank 730. As there may be several such inputs, this signal may be designated within the PLC logic environment as 'AZ_REED_1'. Other reed switches from Auto-Z probes may similarly connect to other dedicated inputs and be referenced by uniquely assigned names such as 'AZ_REED_2', 'AZ_REED_3', etc.

Moving down further in FIG. 7, a digital pressure gauge 760 is shown to be powered by connections to supply line 702 and ground or common line 704. Gauge 760 is connected to an air pressure supply line 762 that is used to pressurized one or more Auto-Z probe actuators 401. The electrical signal produced by gauge 760 in response to pressure in line 762 is provided as input 709 to PLC 710 where it be referenced as 'AZ_PRESSURE' or the like.

PLC 710 is shown to provide one or more separate output signals (via digital output bank 740) to control external electrically-activated components. As shown, a solenoid valve 750 (analogous to solenoid valve 615 shown earlier) is shown to be connected to output port 742 of PLC 710. This connection is one of two connections to an electromagnet coil, motor or means within solenoid valve 150 that act to open valve 721 and allow flow of air through the valve. The other connection is shown to connect to supply line 702. When connected in this manner, energizing current will pass through the solenoid coil when output port 742 is at a state that provides a path to ground, which in many conventions is equivalent to a logical 'low' or '0' state. When interposed between a pressurized source and an Auto-Z probe actuator, valve 721 controls whether the Auto-Z probe is lowered as in FIG. 6 condition (b) (solenoid 'on') or retracted as in condition (a) (solenoid 'off'). Therefore, the electrical state of output port 742 controls the deployment of an Auto-Z probe and there may be several probes (as in FIG. 3: 302,304,306) each controlled by a specific output port.

Though not explicitly shown, solenoid valve 721 may provide for an exhaust port by which pressurized air that has been applied to a given actuator can be relieved and vented once the solenoid valve turns off, thus allowing the actuator shaft to retract.

Figure 8A:
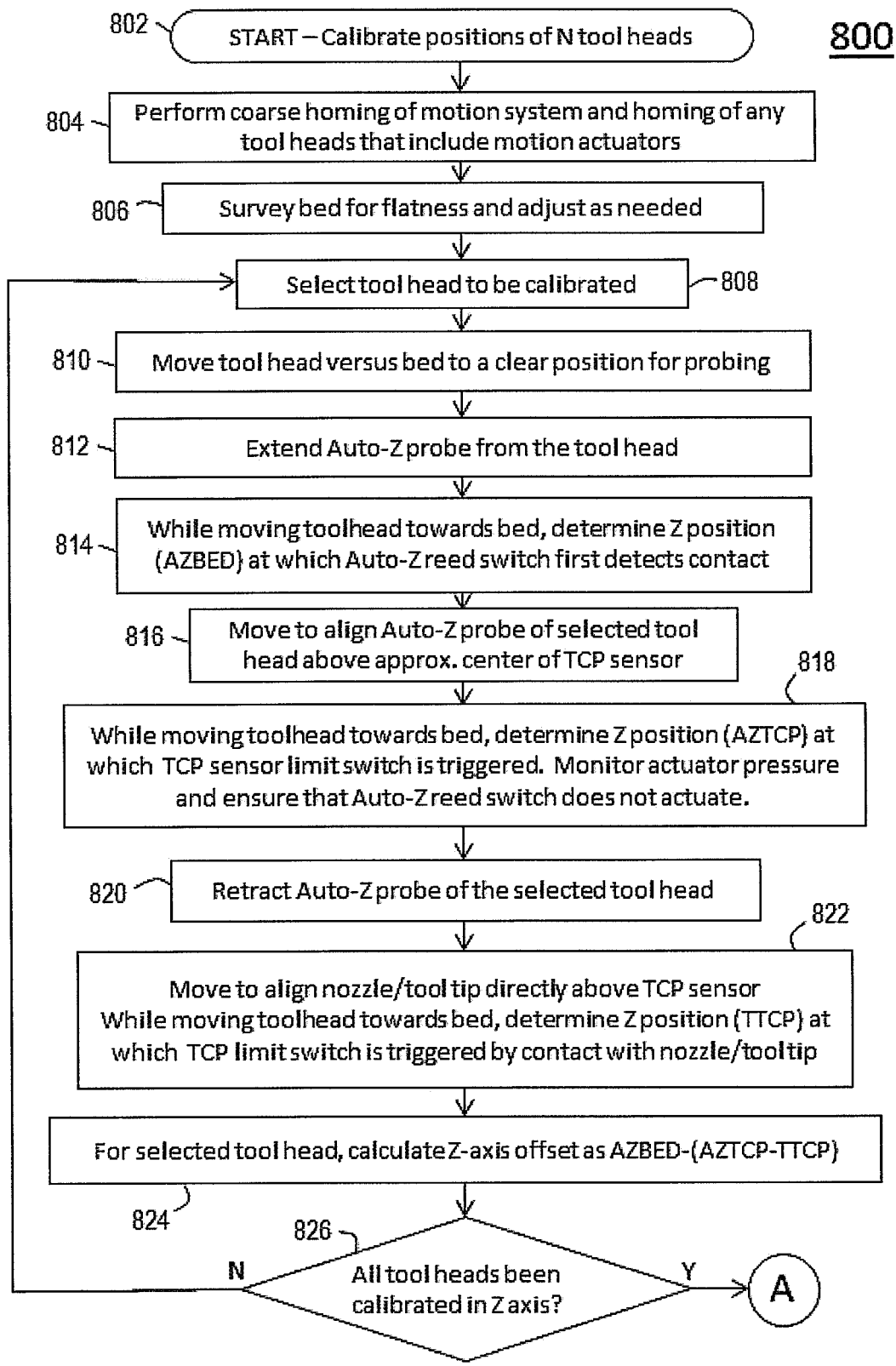
FIGS. 8A-8C present a flowchart for process of automatically calibrating the positions of multiple tool implements operating within a common build space in accordance with example embodiments of the present teachings.
Figure 8B:
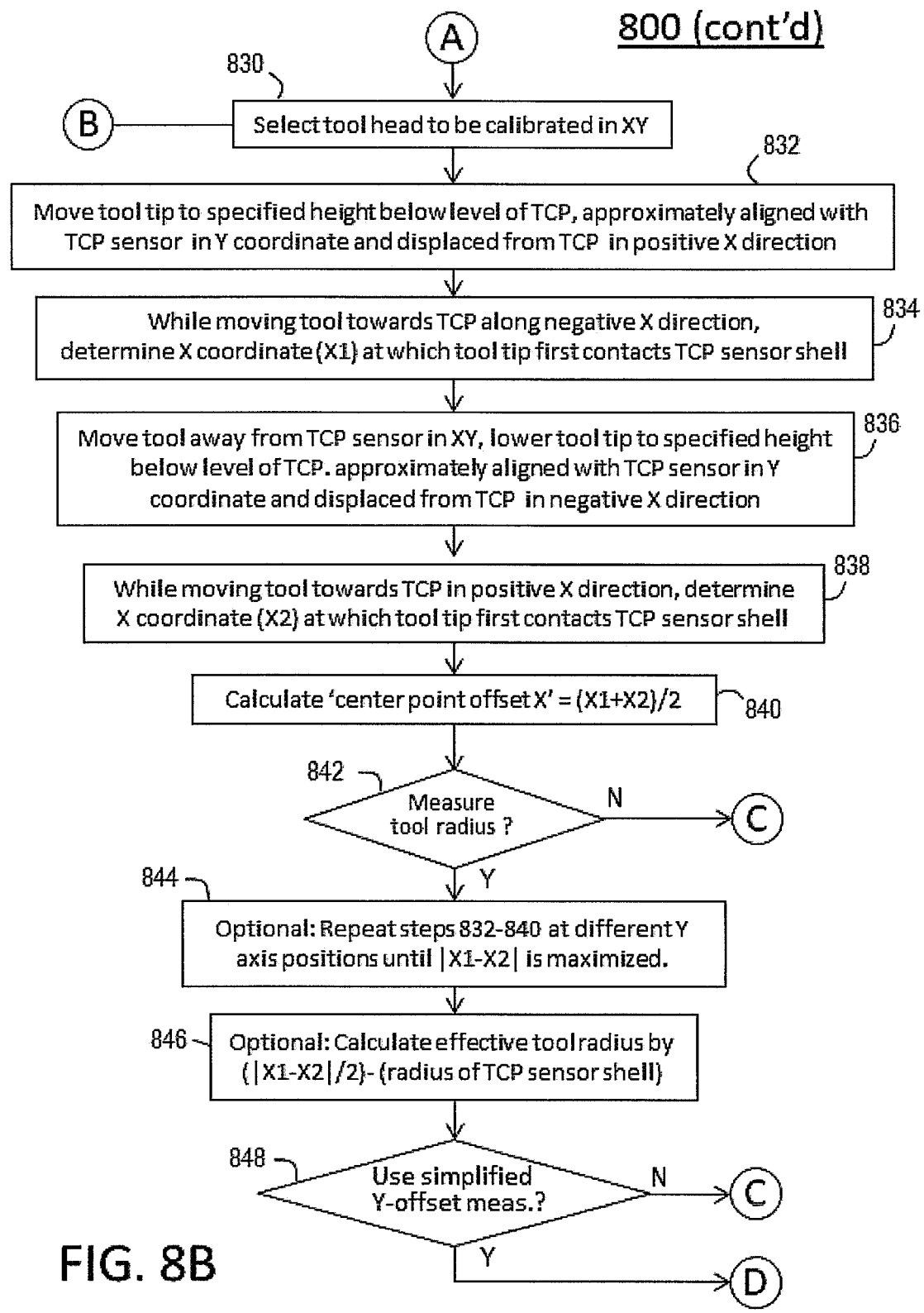
Figure 8C:
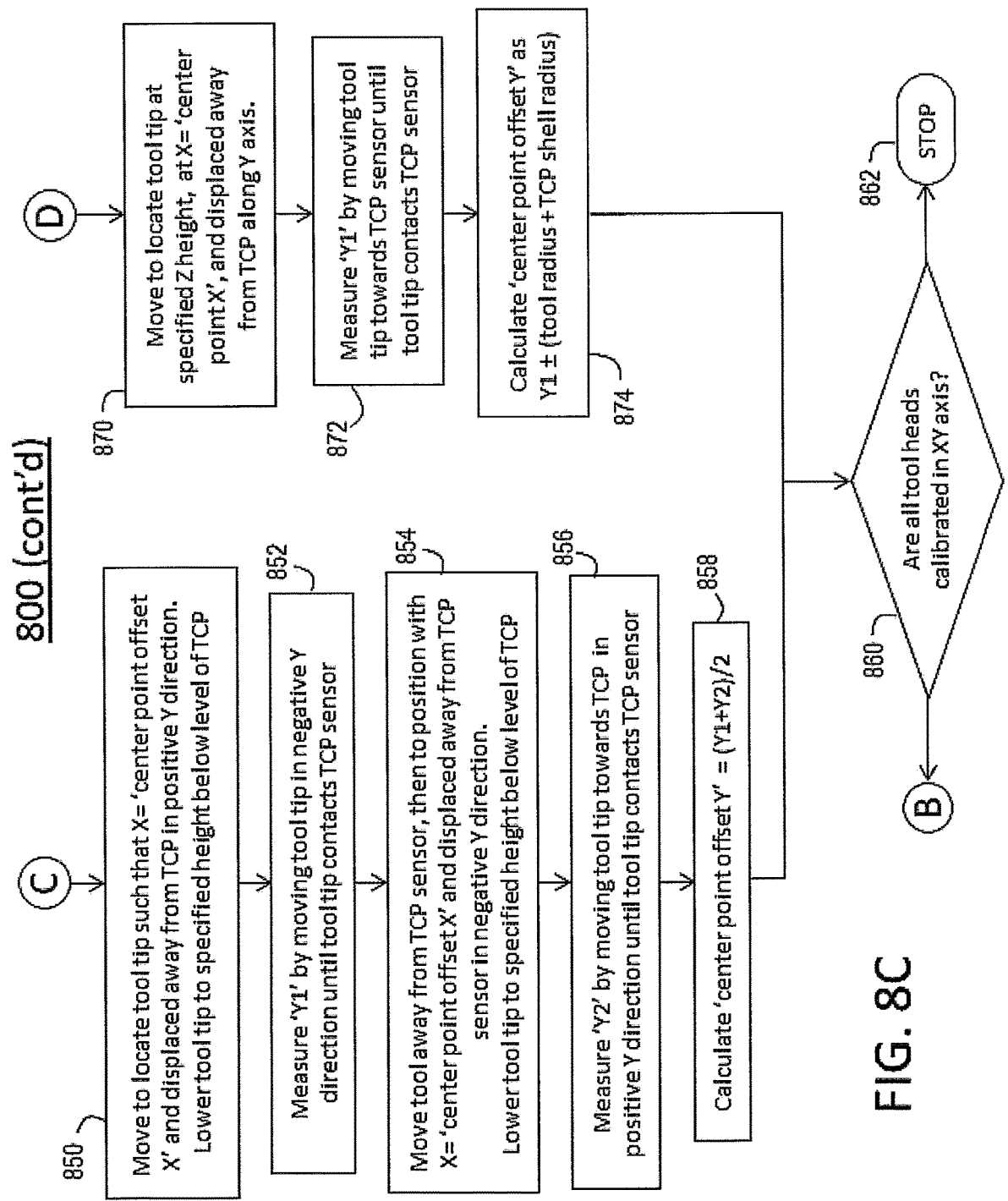

Turning to FIGS. 8A-8C, an example process 800 explains one possible manner in which various components described thus far may be employed in coordination to accomplish highly precise tool-to-tool registration even in a build space being operated at elevated temperatures and involving components with widely varying coefficients of thermal expansion. A fully automated process is also highly desirable because avoids the need to 'break containment' of an elevated temperature enclosure. It should remain clear that process 800 is merely a non-limiting example and that some steps or actions described may be optional, may be repeated (such as for statistical analysis) or may be performed in a somewhat different sequence while still adhering to the key operating principles taught herein and falling within the scope of the presently claimed invention.

Process 800 may execute within or be coordinated by a computer, data processor, microcontroller or other controller, as symbolized by PLC 710 shown earlier or in a system that interfaces with, or subsumes the function of, PLC 710.

Process 800 commences at step 802 upon the identification of a need to 'calibrate', in a sense, the locations of moving devices such as extruders and machining heads within the build space. It is worth reiterating that the conventional per-axis 'homing' switches (typified by switches 280, 281 shown in FIG. 2) that are prevalent in most 3D printers do not address several challenges introduced when multiple tool heads—especially a variety of additive and subtractive tool heads—need to operate on a common workpiece. These homing switches allow for some very general initialization and orientation for servo and stepper type motors, but have no role in sensing proximity or alignment among other components, especially when some other components exhibit have their own independent motion.

Step 802 may correspond to initial power up of system 100 at which time all moving components need to establish a reference from which all subsequent coordinate-specified moves are based. Step 802 may also signal commencement of calibration as requested by an operator of system 100 or programmatically during a build process to assure continued fine calibration even as a build proceeds and as increased mass or warping forces from a work piece underway may affect, for example, deflection of build surface or the system framework.

Step 802 may be initially performed or may be undertaken and possibly repeated once the interior enclosure 110 reaches a desired temperature. Step 802 may be engaged, for example, when a build has been suspended and enclosure 110 has been opened to allow an operator to access system 100. After restoring the enclosure and allowing the internal temperature to recover, process 800 may be carried out to assure recalibration after the temperature swings. Various other events, such as nozzle changes, tool changes, or inadvertent collisions may all be reasons to repeat process 800 so that very precise intra-tool alignment (ideally to within 0.001″) may be consistently achieved in all three dimensions.

Throughout the description of process 800 that follows, any reference to performing a 'move'—whether to achieve clearance or to bring one component into alignment with another—should be construed as involving whichever and whatever motions, in however many axes throughout system 100, achieve the relative spatial relationship that is specified. Depending on machine configuration, calling for a nozzle or tool to be moved to a particular location may actually involve moving the bed in Y and moving the toolhead in in XZ. In an alternatively designed motion system, this same request might correspond to moving the tool head in XYZ while the bed remains stationary. If TCP sensor is hypothetically placed on some form of moving platform or articulating arm, for example, any calls for motion to achieve alignment with the TCP sensor may or may not require moving the TCP sensor itself. Motion paths are highly implementation and situation dependent. Accordingly, references to moving one part versus another are not to be construed in an overly literal or limiting sense.

Upon commencing process 800 with step 802, execution immediately proceeds to step 804 whereupon coarse homing of all motor-driven axes is performed so that, with open loop systems that employ stepping motors, the displacement along an axis of motion at any point in time is determined by keeping count of the number of movement pulses that have been issued to the respective motor. Generally speaking, the act of 'homing' often involves moving slowly in a given direction until a limit switch detects when the moving stage has very nearly reached the end of its range of travel, and then declaring that location to be the 'zero' point from which all other positional offsets are measured. While this has traditionally been done in just three axes in a Cartesian coordinate type motion system, it has now become additionally important that any tool heads that have self-contained motion actuators must also perform their own initialization or homing procedure. It may be important in some designs to ensure that any subordinate tool head motion system (such as a 5-axis robotic arm) perform its own initialization first (or at least adopt low profile configuration) so that no unforeseen interferences or collisions occur as the more overarching motion system 120 performs its initialization.

Heretofore, the typical homing limit switches have been largely adequate when only one or two extrusion nozzles are used. In most legacy dual-extrusion printers, a pair of similar extruder drives and nozzles ride on a common carriage and are painstakingly adjusted to have identical elevation above the bed. Typically, the Z-axis homing point is chosen so both nozzles are right at the top of print bed when the Z-axis homing switch trips. This simple approach is insufficient for handing the variations in extruder types and the addition of independently movable tool tips on some heads. In contrast to traditional practice, the present teachings emphasize ways to orient nozzle and tools as a practice separated from the initial homing of a motor-driven axis within the motion system.

After the coarse homing activities of step 804, step 806 is undertaken to assure that the bed or build surface is 'flat' and essentially level. 'Flatness' usually means that the bed is not warped and is acceptably planar. Levelness, more so than with respect to gravity, really means that the plane of the bed is parallel with a plane defined as the motion system moves in XY while maintaining a constant Z coordinate. Especially for smaller 3D printers, various techniques are known for testing bed flatness and performing 'auto-leveling' of the bed. In the present context exemplified by FIG. 3, step 806 may involve extending an Auto-Z probe and utilizing its ability to detect of bed contact (see FIG. 6—condition (d)) as the means for taking Z-wise measurements at a variety of XY locations. If the bed needs adjusted to achieve flatness or leveling (or the bed unevenness needs to be charted and applied to motion calculations), step 806 includes these acts whether performed manually or automatically by methods that are machine- and operator-dependent and outside the focus of this disclosure.

After bed flatness has been assessed and dealt with in step 806, execution moves to step 808 to select a particular tool head, from perhaps multiple tool heads in use, as the context for steps 810 through 824 that follow. Of course, if there is only a single tool head, such as a pellet extruder, installed in system 100 in a given instance, step 808 simply involves proceeding with the one tool head and step 826 will not return to step 808. Otherwise, step 808 refers to selecting any tool head that has not already undergone steps 810-824. Once a specific tool head is selected in step 808, step 810 is performed to generally move the subject tool head into a position above the print bed. An acceptable position may be programmatically determined or may be operator influenced. This is in preparation for deploying Auto-Z probe to make contact with the bed, so an acceptable location will likely be one that ensures that the probe can reach the bed without having any parts of carriage(s) colliding with other objects, such as partially built workpieces resting on the bed. In step 812, the Auto-Z probe is then deployed, such as by a controller (PLC 710) causing an output port 742 to drive to a low logic state. This, in turn, causes solenoid valve 750 to turn 'on', allowing pressurized gas to flow into a corresponding actuator 401 is attached to a carriage as shown in FIG. 6.

Step 814 involves moving the selected tool head towards the bed slowly while monitoring the condition of the actuator's reed switch 450 for a change of state indicating contact between the probe tip and the bed as depicted in FIG. 6, condition (d). Upon contact, Z-axis motion is halted and the Z-axis positional coordinate is recorded (such as in the memory of PLC 710) as a variable symbolized here by the label 'AZBED'. Note that PLC 710 is hosted by, or in communication with, other processors or running processes responsible for issuing positional instructions to the motion control system. Accordingly, in various similar steps that follow, whenever process 800 refers to determining a position at which contact occurs, the same 'controller' (singular or collective) that issued movement commands to the motion control system is notified of the contact, ceases any further movement commands in the direction of the approach, and records the positional coordinate based on the most recently issued movement command.

Next, in step 816, the toolhead may be withdrawn or raised in the Z-axis and then other axes of motion may be activated to result in the same probe tip coming into alignment above the approximate center of a TCP sensor 500 located somewhere within the build space and accessible to the tool head(s) when the appropriate motions are performed. As explained elsewhere, TCP sensor 500 acts an intermediary or mutual touch point among multiple components within the build space for establishing positional references.

In step 818, the tool head is again lowered slowly along the Z-axis with its Auto-Z probe extended, meaning the corresponding solenoid valve 750 is energized. Unlike step 814, however, step 818 requires monitoring a limit switch 530 for the earliest indication of contact. In accordance with preferred embodiments, the air pressure applied to actuator 401 applies sufficient force along tube 408 so that the upward force from spring 531 is overcome and limit switch 530 is actuated before a reed switch 450 on the probe actuator detects any shaft displacement. During this step, the actuation pressure is monitored and reported to the processor/controller (PLC 710) by gauge 760 via signal input port 709, along with the state of reed switch such as by signal port 708. If either of these deviate unexpectedly before limit switch 530 detects contact, then an error may be raised and the processor may abort the calibration process and signal the machine operator. Assuming normal circumstances, the instant that limit switch 530 detects contact with the moving probe tip, Z-axis motion is halted and the Z-axis positional coordinate is recorded, such as in a data variable referred to as 'AZTCP'. Upon reaching this point, step 820 is performed to retract the Auto-Z probe and optionally raise the tool head. To retract the probe, the PLC 710 can change digital output 742 to a high logic level (24 VDC) or to a high-impedance state so that solenoid valve 750 becomes deenergized.

As an aside with respect to step 818, which merely presents one manner of operation, it is contemplated that several variations are possible while still accomplishing the overall goal of step 818, namely determining a position at which the Auto-Z probe and the TCP sensor make contact. Depending on such factors as the actuator pressure used to extend the Auto-Z probe and the stiffness of the spring 531 within TCP sensor 500, it may be possible to selectively ensure the actuation of reed switch 450 occurs without actuating switch 530, contrary to what is depicted in FIG. 8A and FIG. 6, condition (C). This may be desirable in some instances and may be a static matter of design in implementing system 100 or may be dynamically changed for different tool heads or depending on the specific build. In the latter, controller 710 may exercise control over the pressure applied to actuator cylinder 402 which, in conjunction with spring 531, influences whether switch 530 or switch 450 will 'trigger' first. Another possibility, perhaps implemented by series/parallel hardwiring or by logic operating within controller 710, is to process both switch inputs according to a logical 'OR' or a logical 'AND' function. To be clear, the present teachings are not limited only to detecting the contact between an Auto-Z probe and a TCP sensor using switch 530. Rather, the detection by any of these variations may generally be stated in terms of receiving a signal, from at least one sensor in the group consisting of a first contact sensing probe (via reed switch 450) and the second contact sensing probe (via by switch 530).

From the two measurements acquired thus far, AZBED and AZTCP, a difference can be calculated to establish the Z-offset between the bed surface and the top of the TCP sensor. Given changes in temperature and other factors, this offset (in contrast to conventional homing methods) is measured as needed rather assumed to remain fixed.

To build upon this data, step 822 is next performed to have the actual nozzle, tool tip or other implement (rather than the surrogate probe) positioned above the TCP sensor and to lower said tool tip until it makes contact with the TCP sensor and trips limit switch 530. (Note that the actuator pressure and reed switch status are no longer of any concern during this measurement.) As before, the Z-axis motion is halted upon first contact between the tool tip and the TCP sensor and the Z-axis positional coordinate may be recorded within the processing environment (PLC 710) into a variable called, for example, 'TTCP'. Thereafter, the subject tool head may be raised to provide clearance above the TCP sensor until other motion instructions are issued. It is worth emphasizing at this point that the process of touching the tool tip to the TCP sensor avoids the need to ever bring the tool tip into direct contact with the build surface, as would be potentially detrimental if the tool tip is an extruder nozzle at high operating temperature. Furthermore, sensing the contact based on a significant actuation force allows an extruder nozzle to be accurately located even if it is oozing extruded material.

Step 824 corresponds to calculating the Z-offset between the tool tip and the bed—notably without ever bringing the tool tip into contact with the bed and without having to equip either the bed or the tool tip with contact-sensing means. The tool tip (or nozzle) Z-offset may now be calculated by AZBED−(AZTCP-TTCP) or AZBED+TTCP-AZTCP, which will be the Z-axis coordinate at which the tool tip would just make contact with the bed. (It is assumed that an increasing Z-axis coordinate signifies raising a tool head away from the bed. If this sense is reversed, a very similar calculation will still provide the offset value.)

Having completed the Z-axis offset calibration for one selected tool head, step 826 is performed to determine whether any other tool heads remain to be similarly calibrated in the Z-axis direction. If not all tool heads have been calibrated in 'Z', then execution returns to step 808 to select another one of the as-yet-uncalibrated tool heads and then steps 810 through 824 are repeated using that selected tool head. Alternatively, if the determination is made in step 826 that all tool heads have been calibrated in 'Z', then execution proceeds, as indicated by connector 'A', to step 830 as shown in FIG. 8B. Note that, once two or more tool heads with their respective tool tips have undergone Z-axis calibration as just described, a differential offset may calculated and be applied to assure uniformity when a given precise point on a workpiece is to be addressed by one tool head and then another. For example, assume that tool tip 'A' has a Z-offset of 2.00 mm and tool tip 'B', traveling on the same gantry as 'A', has a Z-offset of 1.20 mm. Thus, tool tip 'B' is 0.80 mm 'lower' than tool tip 'A'. Thereafter, during a build, if tool tip 'A' is operating on the workpiece at a point that is at Z=52.00 mm and the program calls for tool tip 'B' to act on the point, the motion control system should elevate in the Z-axis by an additional 0.80 mm so that the point of action matches that of tool tip 'A'.

Step 830 represents the start of calibrating tool center points in the 'X' and 'Y' directions, as is applicable within Cartesian-type motion systems as shown in FIG. 1. Systems of differing designs (such as Kossel delta designs) may achieve lateral motion using different combinations of motor-driven motion but nevertheless require similar measures to achieve calibration in a similar plane. Furthermore, the locations such systems can reach may always be converted to or expressed in X and Y coordinates along orthogonal Cartesian axes, just as they are in the G-code command files that are typically used to program such systems. References to 'XY' motion in the steps that follow should not be construed to limit the process to only systems that use strictly X-axis versus Y-axis drives.

Once a particular tool head has been selected for calibration in step 830, steps 832 through 840 are then carried out in the context of that tool head, specifically to calibrate each of several nozzles or tool tips with respect to the center of TCP sensor shell 520 and, therefore, with respect to one another. This will allow tools to interchangeably be indexed to a specific point of action upon an object being constructed. Step 832 involves moving the subject tool tip to a position that is away from the TCP sensor shell along the positive X direction, in line with the approximate center of the TCP sensor in the Y direction and lowered to a Z-axis coordinate that would place the tool tip at some distance below the top of the TCP sensor shell. The lowering is performed so that subsequent motion of the tool tip towards the TCP sensor will eventually result in the tool tip making contact with the TCP sensor shell.

Figure 9:
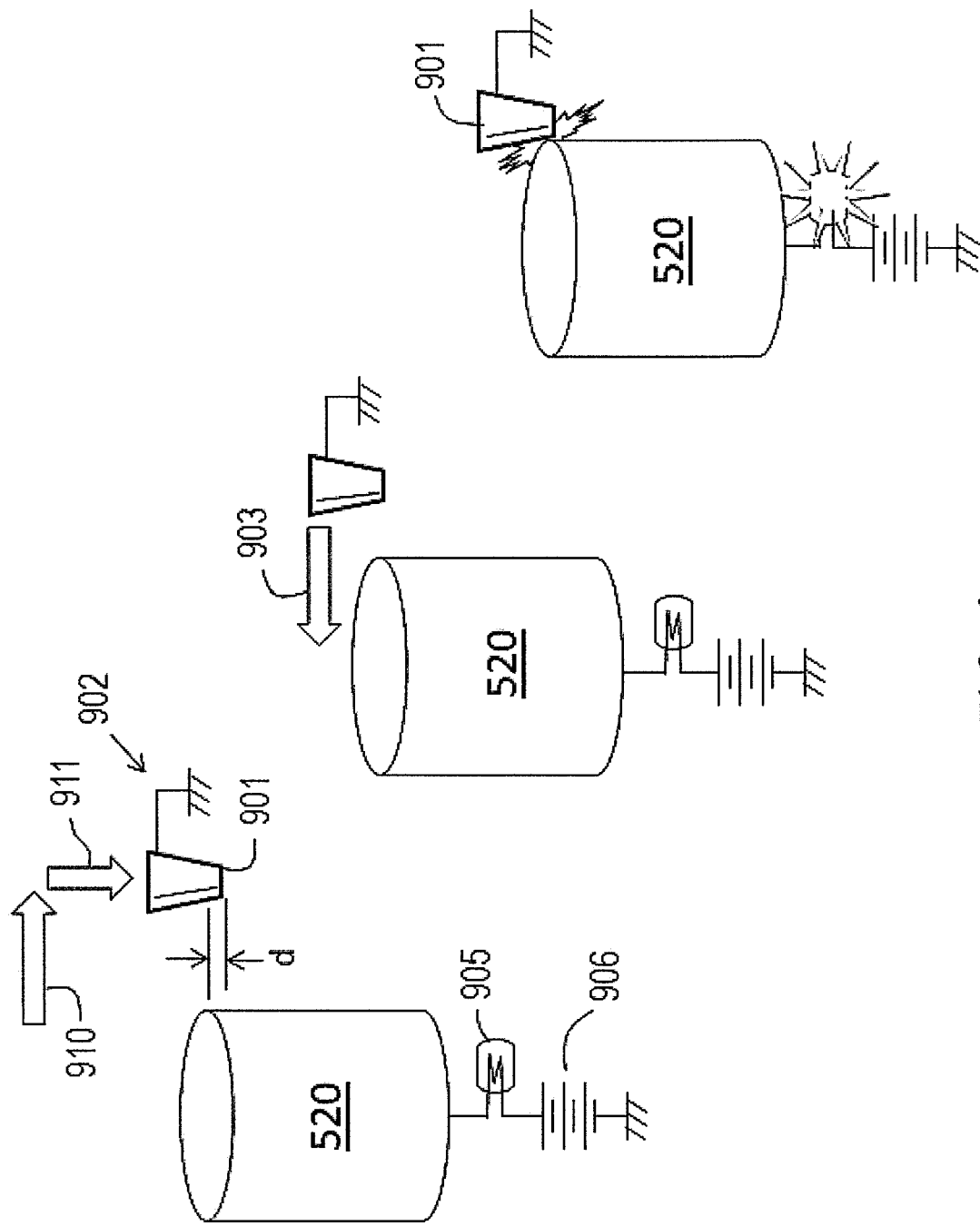
FIG. 9 is a conceptual diagram demonstrating a manner of moving a tool laterally and detecting contact with a reference sensor in accordance with example embodiments of the present teachings.

This action may be best explained by briefly referring to FIG. 9. Here a tool tip (or nozzle) 901 is shown to at first move away (depicted by arrow 910) from a position where it might be directly above the TCP sensor shell and then, once clear underneath, is moved in a downward motion (depicted by arrow 911) so that the bottom of the tool is somewhat below the top of sensor shell 520 by a specific distance 'd'. (This maneuvering is made possible in part by the offset calculation performed during Z-axis calibration as shown in FIG. 8A.) In FIG. 9, tool tip 901 is shown to be connected to at least a chassis ground 902. For demonstrating continuity detection, a lamp 905 and battery 906 are shown connected in series and between TCP sensor shell 520 and chassis ground. With tool tip 901 positioned as shown in the leftmost sketch, there is no completed circuit and lamp 905 remains unlit. The middle sketch in FIG. 9 describes that, once the tool tip is placed below the level of, but away from, the TCP sensor shell, a lateral motion (depicted by arrow 903) may commence to move the tool tip towards the shell while monitoring for electrical continuity. The far right sketch depicts the instance, during this lateral motion, that the tool tip indeed makes contact with the TCP sensor shell and completes the circuit through the chassis ground, allowing current to flow and causing lamp 905 to illuminate. As applied within system 100, of course, the power source is supply line 702 instead of battery 906 and the load is relay coil 711 instead of lamp 905.

As another way of stating the conditions for a lateral approach, especially as expressed in Cartesian coordinates, the tool tip must first be brought to a distance in Z above the plane of the build surface such that a parallel plane defined by moving the tool tip in the other two axes, X and Y, intersects with shell 520. This is satisfied when the tool tip is set at a Z coordinate that places it just below top of shell 520 as shown in FIG. 9, whereupon the appropriate movement in the other two axes is assured to achieve contact between the tool tip and shell 520.

Returning to FIG. 8B, step 832 corresponds to the action that was depicted by arrow 911 and 912, with the further constraint that the tool tip comes to rest displaced from the TCP sensor in a positive X direction but approximately aligned with the TC sensor in the 'Y' direction. This is better understood by referring to FIG. 10A.

Figure 10A:
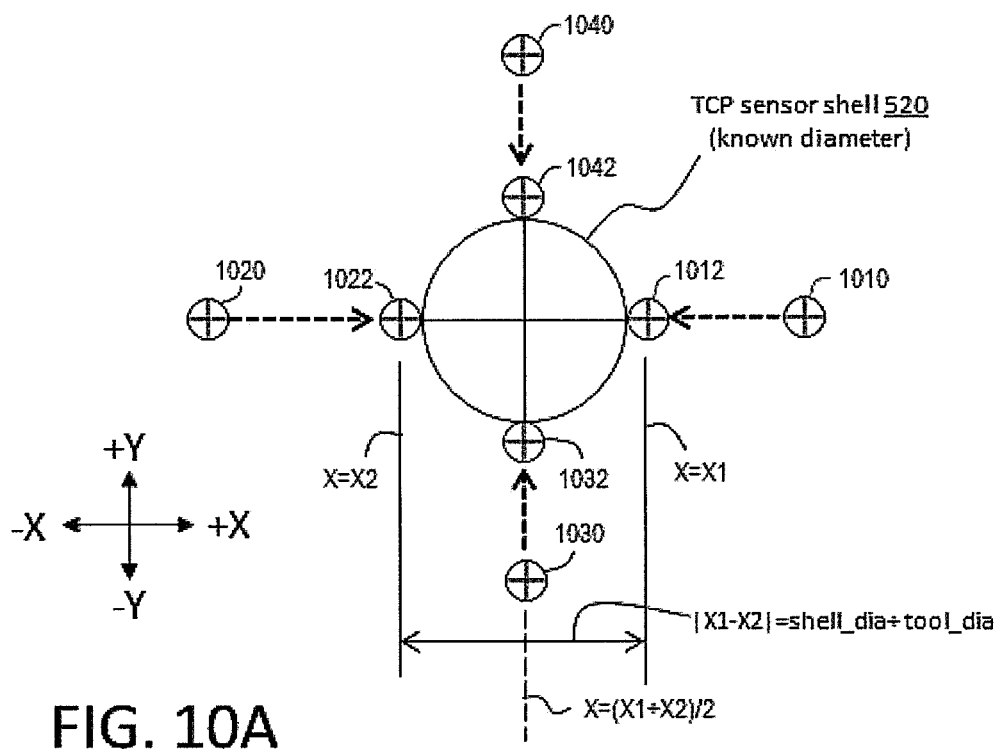
FIGS. 10A-10B depict an overhead view of the lateral approach of a tool towards a reference sensor in accordance with example embodiments of the present teachings.

FIG. 10A is a conceptual overhead view (not to scale) showing TCP sensor shell 520 and the approach direction and eventual contact of a tool tip coming from different directions, as will be called for in various upcoming steps in process 800. In relation to step 832, FIG. 10A shows a tool tip at an initial position 1010 where it is roughly aligned with TCP sensor in the Y direction, (that is, starting at Y_TOOL_TIP=Y_TCP) displaced by some distance away from the TCP sensor by a distance—sufficient so that the tool tip can be lowered without impacting the top of TCP sensor shell. Once the tool tip is brought to this initial position 1010 then, in step 834, the tool tip is moved towards the TCP sensor shell by moving in the negative X direction. This motion continues until continuity is detected, meaning that, referring back to FIG. 7, relay 710 is energized and changes the state at input 706 of PLC 710. When tip-shell continuity is detected, X-axis motion is instantly halted and the tool tip stops at final position 1012. The X-axis coordinate where this occurs is recorded as a value labeled as X1, which may refer to a memory location or stored variable within a controller or the like represented by PLC 710. Once this measurement has been acquired, step 836 is carried out to safely draw the tool tip away from the TCP sensor shell and reposition it to another starting position 1020, this time displaced from the shell in a negative X direction.

Analogous to step 834, step 838 involves moving the tool tip toward the TCP sensor shell—this time in a positive X direction—until continuity is detected. As soon as continuity is affirmed, the X-axis motion is immediately halted, so the tool tip ends up at location 1022. The X-axis coordinate where this occurs is recorded as the value of X2.

Once both X1 and X2 measurements have been acquired, then step 840 is executed to calculate a so-called 'center point offset X' which is the hypothetical X-axis coordinate at which the tool tip would exactly align with the X-axis center of the TCP sensor shell. This offset mainly finds use once all other tool tips have been similarly aligned to the TCP sensor, because then all of the precise tool-to-tool or 'differential' offsets can be calculated—even across a mixture of extruders and spindle-mounted tool tips.

It is important to highlight that, due to the symmetry of the shell, the X1 and X2 measurements may precisely find the X-axis centerline of the TCP sensor shell even if the tool tip approach path is not perfectly aligned with the TCP sensor shell Y-axis centerline. An optional further procedure, as set forth in step 844, may be performed wherein the approach from both X directions shown in FIG. 10A may be repeated at slightly varying Y-axis coordinates until the absolute difference between X1 and X2 is maximized. Some refinement of the 'center point offset X' may be realized by seeking this maximum. Once this maximization is found then it is likely that the final positions 1012 and 1022 are diametrically opposite one another and separated by a distance that is the sum of the TCP shell diameter and the tool tip diameter. Based on this, another optional procedure, presented as step 846, may be executed to calculate effective radius of the tool, which is mostly important for spindle-mounted cutting bits because the point of engagement with a workpiece will often be from the side of the bit.

If the optional steps 844 and 846 are deemed unnecessary in a given application, such as where tool radius is unimportant to measure, then decision step 842 causes execution to move to step 850 shown in FIG. 8C. Otherwise, if there is value to assessing tool radius or if the simplified Y offset measurement process of steps 870-874 is preferred over that of steps 850-858, then step 842 is decided in the affirmative to proceed with steps 844 and 846, thereby making steps 870-874 available. Once steps 844 and 846 have been performed and the tool radius is known, it is still possible to use the tool radius data as just that and still opt for the more complex bi-directional Y-axis calibration of steps 850-858. Hence another decision step 848 represents the election of either the bidirectional approach via connector 'C' or the simplified unidirectional approach via connector 'D'. Note that decision block 848 may also represent a design decision rather than an 'on-the-fly' runtime decision. A given implementation of system 100 and particularly software or firmware within controller (PLC 710) may not even include a provision for steps 870-874. An alternative implementation of system 100 might always perform steps 870-874 and have no provision for steps 850-858. These choices are left to a designer, programmer or user and are not presented to imply that the present teachings are in any way limited to one or the other choice, that both choices must be made available, or that the choosing shown in step 848 must be, or must not be, performed dynamically while the system is operating or engaged in a build.

Turning to FIG. 8C, the two approaches for measuring to find the 'center point offset Y' are presented. Steps 850-858 resemble the procedure described for the X-axis in steps 832-840 and are pictorially represented by tool positions 1030→1032 and 1040→1042 in FIG. 10A. Steps 850-858 determine the Y offset without requiring the tool radius or without utilizing the tool radius even if it was electively calculated by execution of steps 844 and 846. In contrast, steps 870-874 provide a somewhat simpler determination of the Y offset made possible when the tool radius has been calculated in steps 844-846. This is pictorially explained in FIG. 10B.

Figure 10B:
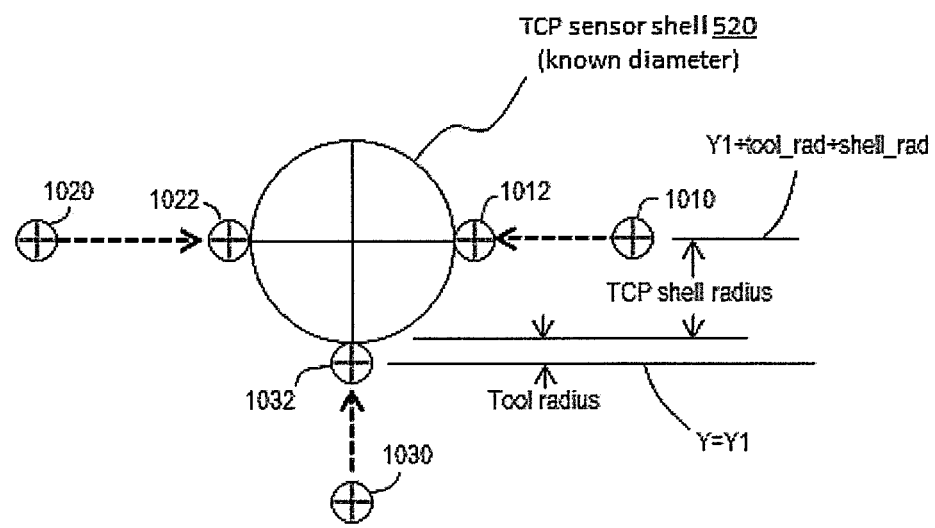

In FIG. 10B, the positions and approach paths depicted by 1020-1022 and 1030-1032 are the same as presented and explained in connection with FIG. 10A. FIG. 10B also shows, as with FIG. 10A, a Y-axis approach from position 1030-1032 (see step 870). Upon detecting continuity and halting travel at position 1032 (see step 872), the 'center point offset Y' is calculable because both the tool radius and the TCP sensor shell radius are precisely known. As shown in step 874, the 'center point offset Y' is the Y-axis coordinate of the final tool position 1032 plus the tool radius plus the TCP shell's known radius. Alternatively, if the approach were made from the positive Y direction, then the 'center point offset Y' would be the Y-axis coordinate of the final tool position 1032 minus the tool radius and minus the TCP shell's known radius.

Throughout the above explanation surrounding FIGS. 8, 9 and 10A, the establishing of a central X offset, first by an approach from positive X then from a negative X direction, is just a non-limiting example. The sense of X and Y may be reversed while still accomplishing the end result of determining the X and Y coordinates at which a nozzle or tool tip would align with the center of the TCP sensor shell. The Y-axis measurement may take place first using steps 832-840, followed by the X-axis determination of the later steps, including the option to determine tool radius and utilize an abbreviated determination for the latter axis. Furthermore, the directions of approach that are depicted as following strictly one axes or the other are shown by example, to simplify the explanation and may, in fact, be preferred for practical reasons. The approach toward the TCP sensor may be along any azimuth, a linear combination of motion in both lateral axes or, in some systems, driven along one of several non-orthogonal axes. After a first measurement has been made analogous to step 834 but using an off-axis approach azimuth, then the complementary approach called for in step 838 should ideally come from an exactly reverse direction, meaning 180 degrees different from the first approach azimuth. The sequence order of approaching from positive and then approaching from negative may also be reversed and the example sequence of positive-then-negative approaches should not be taken as limiting the scope, nor the range of possibilities contemplated by, the present teachings.

While a singular TCP sensor arrangement has been shown by way of example, it is contemplated that in complex multiple head systems it may be challenging or impractical for all tool heads to reach the same TCP sensor. The principles set forth herein may nevertheless be extended to provide highly precise positional calibration using multiple TCP sensors by 'chaining' the calibration measurements. For example, assume that a given system employs two TCP sensors, TCP1 and TCP2, and five tool heads, named A, B, C, D and E. Further assume that TCP1 is reachable by heads A, B, C and that TCP2 is reachable by heads C, D, E. The ability of head C to calibrate to both TCP1 And TCP2 using the presently disclosed techniques enables heads A, B to be become precisely registered to heads D, E in terms of mutual offsets in XYZ.

The explanations offered so far assume that a tool or nozzle contacting the TCP shell is radially symmetrical. Where a given nozzle is cylindrical or conical at its tip but transitions to, for example, a hexagonal shape for being turned by a wrench, a specific depth 'd' shown in FIG. 9 is carefully chosen to ensure contact with the round part of the nozzle. Because nozzle shapes and depth of insertion into an extruder barrel can vary, it may be desirable to dynamically calculate (within a controller) the depth 'd' in view of the Z-axis offset measured for the given nozzle in steps 810-824.

For some spindle-mounted tools, such as fluted end mills and router bits, the cut they perform may be perfectly symmetrical but these tools may come to rest in random positions and give misleading or highly variable positional data. They may come to rest such that the TCP sensor shell nestles into a flute rather than at the outermost cutting edge. A procedure may be adopted for repeated cycles of approaching the TCP shell after allowing the spindle to turn and then come to rest each time. Over several measurement cycles, the touch that occurs furthest away from the nominal TCP center is likely indicative of the effective radius of the tool.

FIGS. 11A-11E present a sequence of conceptual sketches as part of a 'walk through' example of how to apply calibrated offsets that have been obtained as described herein. All of these sketches are overhead views of a build surface 130 along with superimposed features representing the locations of tool tips and a TCP sensor along X and Y axes. Locations in these views are referenced to the lower left corner, with more positive X coordinate values corresponding to movement of a nozzle or tool from left to right relative to the build surface shown. More positive Y coordinate values correspond to bottom to top movement of a nozzle or tool within this view. These sketches present example coordinates but are not drawn to scale.

Figure 11A:
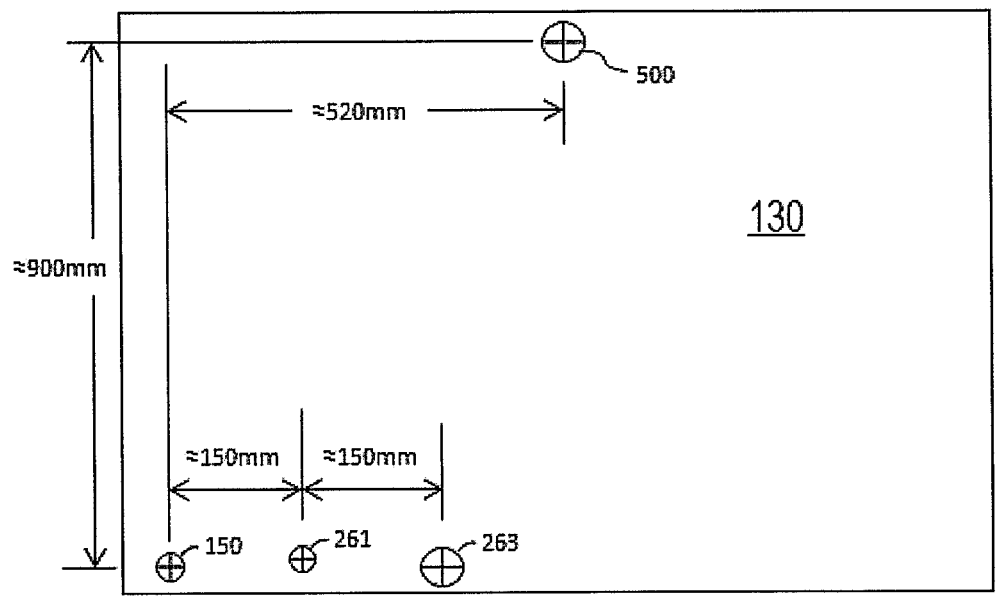
FIGS. 11A-11E are conceptual diagrams to explain a manner of applying measurements and calculated offsets to subsequent operations in accordance with example embodiments of the present teachings.

FIG. 11A shows some approximate nominal locations of some components as determined by the design and construction of the system. Shown superimposed above build surface 130, a collection of nozzles or tool tips are shown at rest after a homing procedure has been completed in both build X and Y directions. For the purposes of this example, the collection comprises the pellet-extruder nozzle 150, the filament extruder nozzle 261 and a spindle-mounting tool tip 263 as were first shown in FIG. 3. Any other complement of tools could be similarly used. Furthermore, as depicted in FIG. 3, it will be assumed that these tools move together in X and Z axes because they are mounted to a common part of the motion system, all moving along transverse beam 125. The particular design of the system shown by example in FIG. 3 accomplishes Y-axis movement by moving the build surface. Thus, any movement in Y is identically applied as the same movement, relative to the build surface, for all three tools. For simplicity, then, this example provides that all three tools are moved together as a cluster 1102. In alternative systems, the tool tips may be decoupled to move independently in one or more axes, but the present teachings would still be applicable and advantageous nonetheless.

FIG. 11A particularly portrays that the nozzles are approximately 150 mm apart and that, in comparison to the home position (at which nozzle 150 is considered to sit at X=0, Y=0) a referential contact sensor, TCP sensor 500, is shown to be situated with its center being offset approximately 520 mm in X and 900 mm in Y. In other words, upon directing the motion control system to move to coordinates [X520.0, Y900.0], cluster 1102 would move relative to build surface 130 to bring nozzle 150 directly in line the approximate center of TCP sensor 500 (assuming adequate clearance is provided in the Z direction.) While these approximate offsets suffice for coarse positioning needed to carry out the steps of process 800, these offsets need to be much more precisely known, especially at a given operating temperature, to achieve alignment among multiple tools addressing a particular point on an object being manufactured.

Figure 11B:
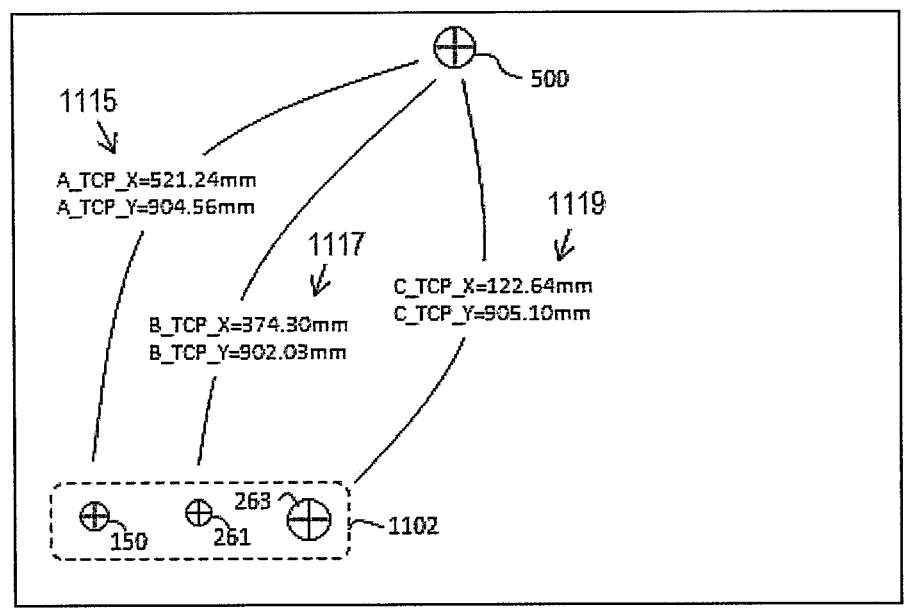

FIG. 11B depicts the situation of having completed process 800 for each of the three tool tips. For and having calculated XY offsets 1115, 1117, 1119 for each of the tool tips 150, 261, 263, respectively, each of which is relative to the inferred center coordinates of TCP sensor 500 (see step 840).

Figure 11C:
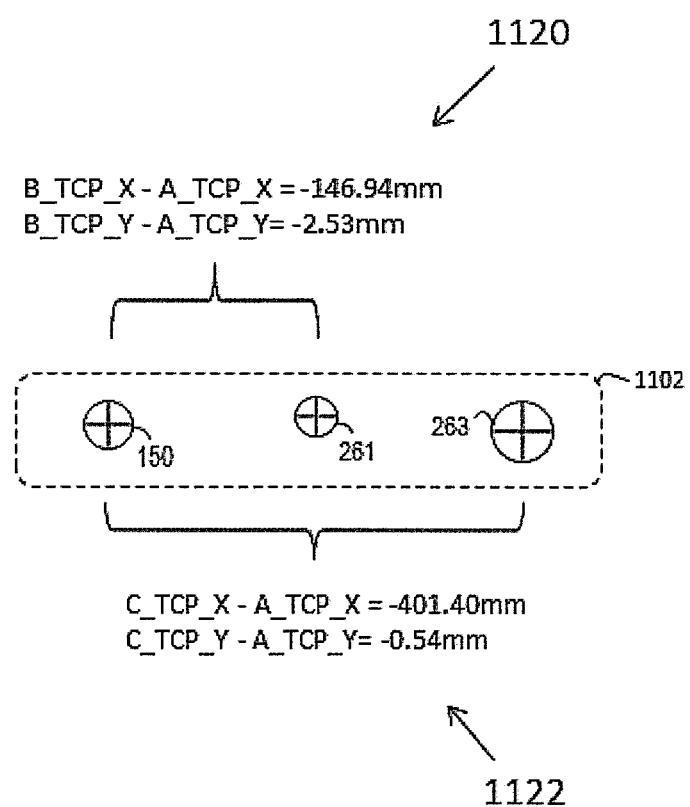

FIG. 11C represents a conversion of offsets expressed with respect to TCP sensor 500 into 'tip-to-tip' differential offsets. A first set of XY offsets 1120 are calculated from the TCP offsets as shown, so that the offset of tool 261 is determined relative to tool 150. Likewise, XY offsets 1122 pertain to tool 263 relative to tool 150. The value of this approach will become more apparent in view of FIGS. 11D and 11E.

Figure 11D:
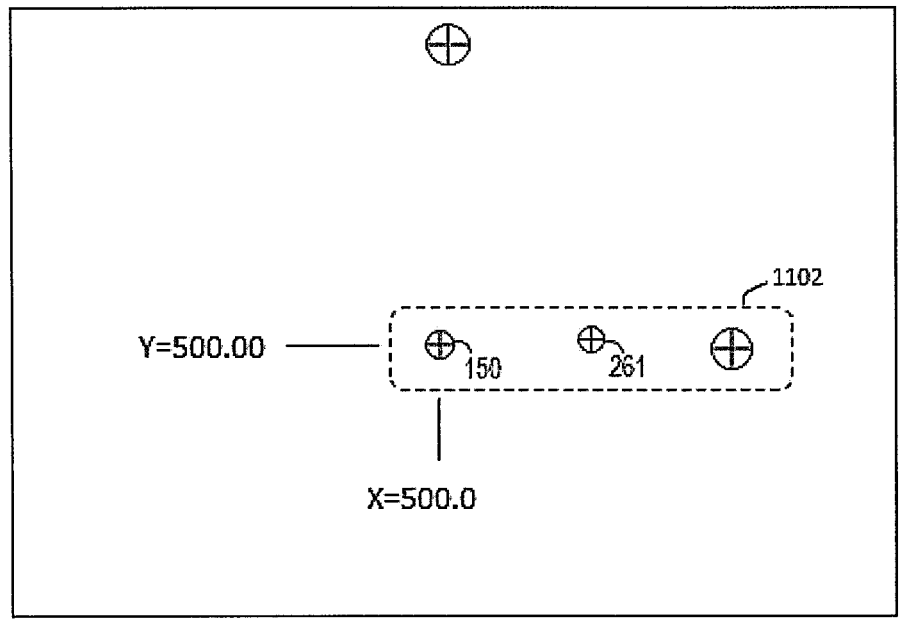

FIG. 11D depicts a situation in which the motion control system as brought tool 150 (extrusion nozzle 150) into a position referenced by coordinates [X=500, Y=500]. Tool 150 may extrude material at this point, and perhaps a series of other points in succession. After tool 150 has performed the necessary actions, another tool 261 may be called next to act upon the particular location or upon nearby locations with highly precise registration to the processing that tool 150 has applied at the particular point.

Figure 11E:
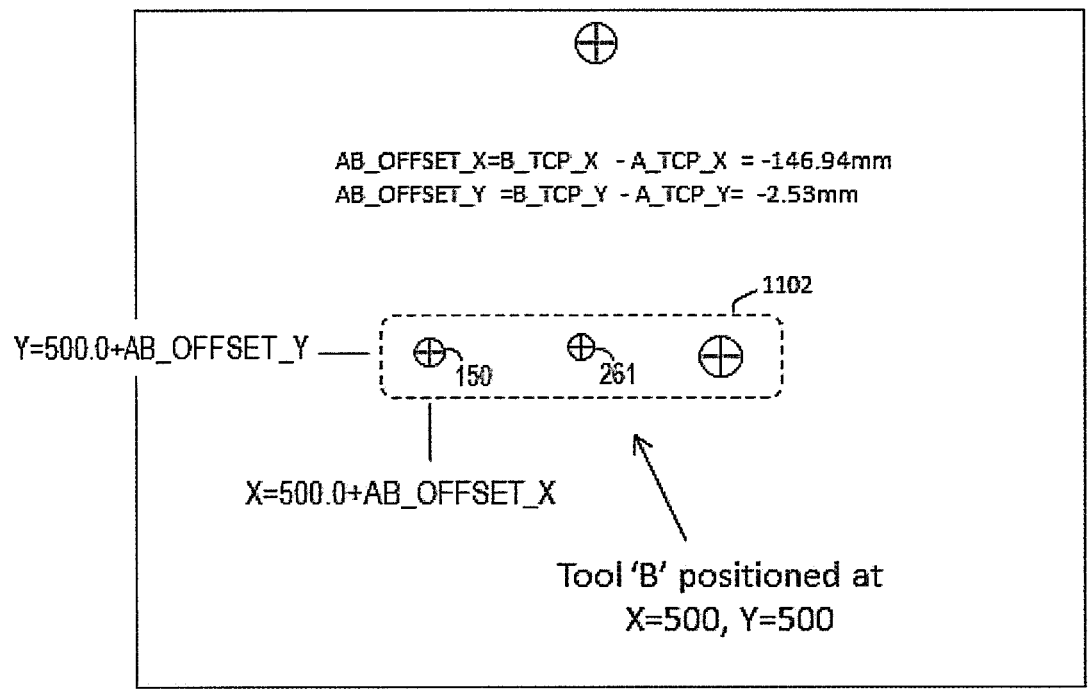

Accordingly, FIG. 11E demonstrates how a different tool, tool 261, may move to the exact same location previously covered by tool 150, simply by moving to coordinates that are the same as before but with the addition of tool-to-tool offsets 1120. Thus, where a higher level plan calls for performing an operation, such as an additive process, at a particular XY point and then for a different operation, such as drilling, at the same XY point, the tool switch is effectively performed (such as by a controller associated with the system) by shifting the XY coordinates that are sent to the motion control system. In fact, a sequence of positional commands references may be shifted by a given offset vector for as long as an alternative tool selection is in effect. In FIG. 11E, tool 261 is brought to bear on the subject point [X=500, Y=500] by shifting the movement of the ensemble cluster 1102 such that the first tool tip, though presumably inactive, hovers over X=353.06, Y=497.47. These are the coordinates issued to the motion control system to implement tool 261 being at the target location for action ([X=500, Y=500]) rather than tool 150.

Figure 12:
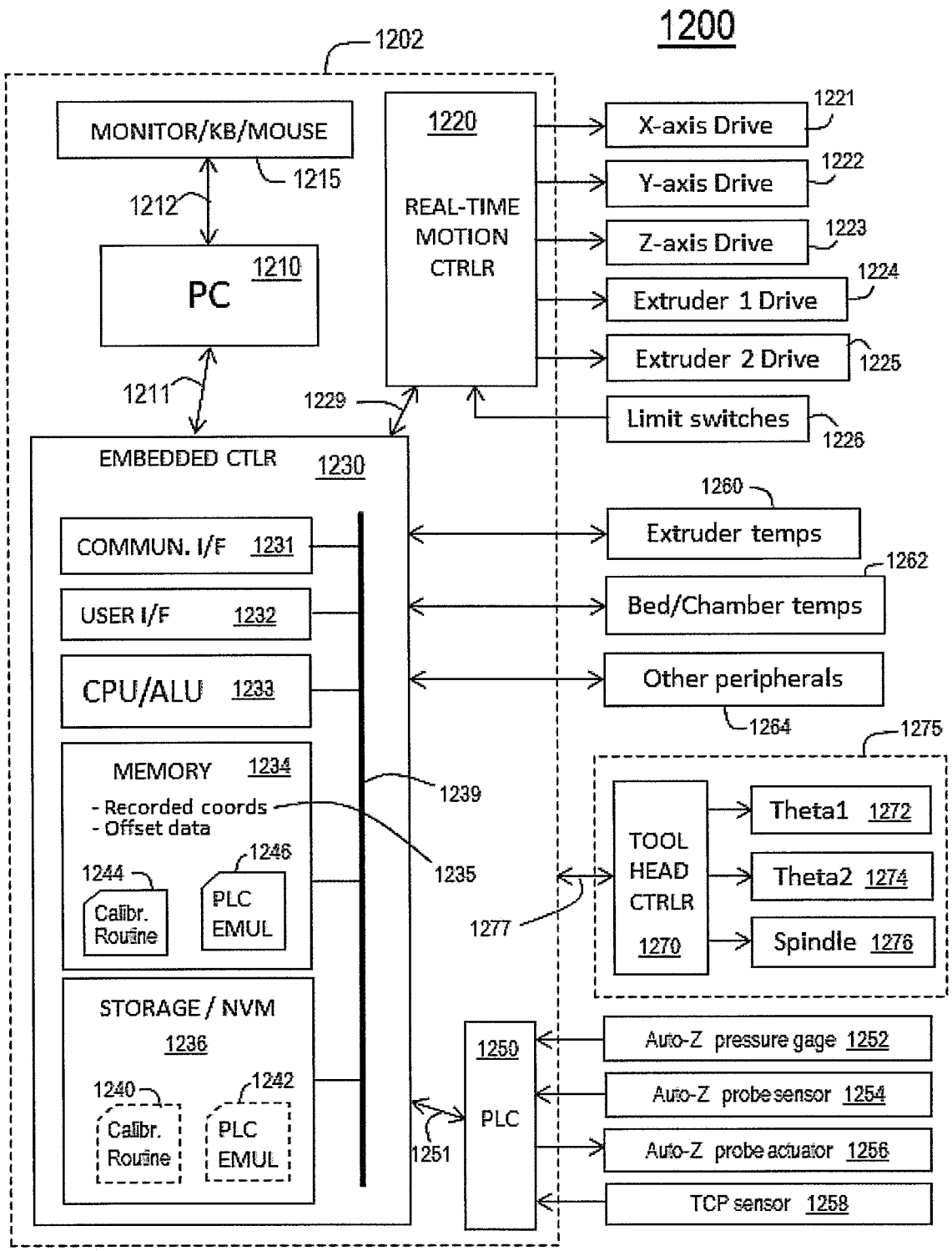
FIG. 12 is a diagram showing data processing realms as may be applied to carry out automated procedures in accordance with example embodiments of the present teachings.

FIG. 12 presents a generalized diagram 1200 of a computing 'ecosystem' 1202 showing a variety of computing contexts which may be applied, collectively and in various combinations, to implement aspects of the present teachings. The right side of diagram 1200 also shows the peripheral components that act on signals from, or supply signals to, whatever computing entities are involved in carrying out the automated manufacture role of system 100, including a calibration process, such as process 800, in accordance with an embodiment of the present teachings.

Throughout the description of FIG. 12, it should be considered that a role performed by any logical processing entity depicted here may, in reality, be subsumed within or hosted by another of the processors shown. Conversely, certain activities depicted as being encompassed within a given logical processing context may actually be implemented as a process executing in a separate subordinate processor that is communicating with, and acting as an extension of, the processor shown.

For example, computing ecosystem 1202 is shown to comprise real-time motion controller 1220 which principally serves to send signals to motor drive electronics represented by X-axis drive 1221, Y-axis drive 1222 and Z-axis drive 1123. These instances of drive electronics respond to signals from the real-time controller to cause the motors to move in a controlled fashion. These drivers may, in a sense, amplify and condition the comparatively weak signals from the controller, providing substantial power to drive the motors, such as stepper motors and servos. Drive electronics may also interpret single directional pulses from a controller into specific, more complex output signals needed to achieve the incremental motion. In the case of stepper motors, drive electronics must maintain the on-off or polarity state for multiple sets of motors windings and determine which output lines must change state to provide a single increment. Servo drivers must apply well formed current pulses or phase adjustments within a feedback loop to accomplish the motion requested by a pulse from a controller.

Where extruders are being used to deposit material and the extrusion must closely synchronize with the motion of a nozzle being moved by one or more of drives 1221, 1222 the extruder motors are also coupled to receive motion signals from controller 1220. The arrangement described thus far is typical of many 3D printers.

Controller 1220 is also shown to receive input from a collection limit switches 1226 (see switches 280, 281) which serve to provide a reference during the homing initialization described earlier. Limit switches can also be placed at extremes of allowable travel to prevent motors from inadvertently driving components past their permitted range of motion and causing damage to the machinery.

The real-time controller 1220 dispenses precisely timed signals to assure coordinated movement among multiple axes and to also carry out controlled acceleration and deceleration. The 'real-time' aspect relates to having to emit movement signals at a very steady rate to multiple axis 'channels'. If such a controller were to be momentarily sidetracked with some task, such as servicing a user interface, this could cause a momentary disruption in movement and could cause one or more axes to skip pulses and loose positional integrity. A real-time controller is specifically designed and programmed to prioritize its generating of timely and synchronized output signals above all other activities.

The combination of real-time motion controller 1220 with the drive electronics, motors and the motive parts of system 100 that move in response to the motors may be referred to as 'motion control system'. In many cases, a real-time motion controller 1220 receives positional commands from a superior controller or process of some nature as indicated by communicative connection 1229. Positional commands essentially tell the controller 1220 what coordinates to move to but delegate to the controller the task of determining what temporal sequence of signals must be generated to accomplish the requested positioning. Of course, communicative connection 1229 may actually be a wired connection, communication over a serial or parallel bus or data network or may simply amount to function calls or inter-process communication if the real-time controller function is hosted on the same processor that is also performing other roles within ecosystem 1202. Real-time motion controller 1220 must communicate 'upstream' to a requesting process when it has successfully completed a move and is ready to handle a next request. Controller 1220 is often designed to buffer a series of upcoming commands to provide for some 'look ahead' processing and acceleration planning.

Note that real-time motion controller 1220 maintains the last known positional coordinate along each motive axis as part of calculating how to reach subsequently requested coordinates. Controller 1220 may also be queried by another entity (such as controller 1230 along link 1229) for the current positional coordinates of the motion control system along one or more axes. This ability enables the recording of the then-current positional coordinates as called for in steps 818, 822 and elsewhere in process 800. These values retrieved from controller 1220 may be, for example, stored as data values 1235 within memory 1234.

Personal computer (PC) 1210 represents a typical desktop or laptop that supports user interface devices 1215 such as display or monitor, a keyboard, touchscreen, mouse, etc. Communicative connection 1212 shown between the PC and the interface devices may be a mixture of wireless, wired cable or internal bus connections. PC 1210 is often the environment in which a human user creates or manipulates a model of an object that is to be manufactured using system 100, essentially by invoking the capabilities of various components on the right side of diagram 1200. PC 1210 may run applications that accomplish such 3D design as well as other software that 'slices' an object model to yield a layer-wise sequence of G-code for controlling the motion axes via real-time controller 1220. In some implementations, PC 1210 may be capable of directly communicating with real-time controller 1220 and causing motion to occur responsive to instructions originating from PC 1210.

PC 1210 may also be a host for a software developer to author software to generate models, G-code instructions or even software or firmware to be loaded and executed by other processors in ecosystem 1202. PC 1210 should be understood to comprise a typical complement of data memory, non-volatile data storage, a central processing unit (CPU), an arithmetic logic unit (ALU), display subsystem, input/output interfaces, etc.

PC 1210 is shown to be communicatively coupled, via 'connection' 1211, to yet another processing context, embedded controller 1230. As with any of the similar connections depicted in diagram 1200, connection 1211 may be a wireless link, communications over shared bus or a point-to-point data communication link, transport via data network, the physical passage of removable data storage media from one device to another, or even inter-process communications or API invocations if the entities shown connected are, in reality, hosted on the same physical processor or logic processing environment. Embedded controller 1230 represents the type of small controller (such as Arduino or Raspberry Pi systems) that is integral with a given system 100, such as control box 160 introduced earlier. Controller 1230 typically supports a limited user interface such as a small LCD screen and a small dial or a limited quantity of pushbuttons. In some implementations, the functions of real-time controller 1220 may integrated into embedded controller 1230, requiring careful design of firmware to meet the demands of real-time control.

Embedded controller 1230 is shown to comprise common computing components communicatively coupled through a shared bus 1239, such as core CPU/ALU 1233 and user interface peripheral adapter 1232. Adapter 1232 allows CPU 1230 to provide display, such as through an LCD screen, and to receive inputs from a user. CPU 1230 may present menu options via the display and receive user selections thereof.

Controller 1230 is shown to comprise communication interface 1231 which may correspond to USB ports, Ethernet connections and the like. Note that, despite being considered a 'mountable drive' more akin to non-volatile storage 1236, an SD card reader may also be supported as a form of transporting data to the embedded controller 1230, such as by carrying G-code, software, settings or other data from an external source like PC 1210.

Controller 1230 comprises memory 1234, which may be typically characterized as volatile RAM providing fast access by the CPU for storing runtime variables data and for 'loading' and executing software instructions. For even better performance, some cache memory may reside within CPU 1233. Volatile RAM is so named because it preserves data contents only for as long as electrical power is maintained to controller 1230. Memory 1234 may hold, for example, data values such as recorded coordinates and calculated offset data stemming from the operation of process 800 and as described in FIGS. 11A-11E.

To preserve long-term data, such as executable instructions that must be loaded and executed after each power-up, controller 1230 also comprises storage or non-volatile memory 1236. In larger computers, such as PC 1210 this type of storage is typically fulfilled by so called hard disc drives and, more recently, by solid state drives. In smaller embedded systems like controller 1230, however, the non-volatile storage is frequently implemented using onboard flash memory, similar to the technology currently used in SD cards and USB sticks or 'thumb drives'.

Shown within storage 1236 are two 'images' of executable programs, one being calibration routine 1240 and the other being PLC emulator 1242. Either of these data images may have been copied into storage from, for example, a SD card, thumb drive or other removable computer-readable media, or by download from PC 1210 or from a remote computer over a data network, such as a server accessible via the Internet. Calibration routine 1240 comprises instructions that, when loaded into runtime memory as image 1244 and executed by CPU 1233 carries out the steps of process 800 involving, as necessary, controllers 1220 and 1250. PLC emulator 1242 corresponds to a process or application for emulating the behavior and interfaces typical of traditional programmable logic controllers (PLCs), characterized by being programmed according to the IEC 61131 standard. In preparation for execution, if invoked, this stored program is 'loaded' into memory 1234 as runtime process 1246, meaning that, for example, executable instructions are copied from storage into areas of faster volatile memory, function entry points are mapped to specific memory locations and memory space is allocated for storing variables and such. When loaded and running, process 1246 may partially or fully fulfill the role of PLC 710 described earlier.

A separate PLC 1250 is shown within ecosystem 1202, representing the option of having a separate PLC, per se, operating with some internal logic upon inputs and outputs as described in connection with FIG. 7. The logic for the PLC may be downloaded from another entity, such as controller 1230 via connection 1251. Alternatively, PLC 1250 may represent a signal conditioning interface between controller 1230 and the various sensors 1252, 1254, 1256 and actuator(s) 1256. Auto-Z pressure gage 1252 corresponds to one or more of gage(s) 760. Auto-Z probe sensor 1254 corresponds to contact sensing element such as reed switch 450, which may be plural. Auto-Z probe actuator 1256 refers to one or more solenoid valves 750. TCP sensor 1256 accounts for two signals coming from a TCP sensor 500, which are the axial or top-facing contact sensor, switch 530, and the radial contact determined by electrical continuity presented along signal line 536.

If PLC 1250 is but a signal conditioning adapter, then connection 1251 signifies an interface to these I/O signals with a process running elsewhere, such as PLC emulator process 1246 executing within controller 1230. Any process hosted anywhere in ecosystem 1202 may suffice, whether or not programmed to emulate a PLC, and successfully execute the sensing and actuating steps explained herein. The present teachings are not confined in any way to including or excluding a PLC as a physical or logical entity.

Any or all of the physical and logical processing contexts described in diagram 1200 may correspond to contents of control box 160 or to be hosted, collocated with, or communicating with a controller within box 160. In many implementations of conventional 3D printers, controller 160 includes an embedded controller 1230 with integral LCD display and controls (see display 164 in FIG. 1) and may also house or be wired to an associated RTC 1220 driving the motors. Additionally, RTC 1220 or controller 1230 typically also control temperatures in the system. In smaller implementations, as the RTC 1220 already handles high current levels if there are on-board motor drivers, the thermostatic control of current to heating elements may also be handled on the same physical circuit board which is often provided with forced-air cooling. In larger systems, the temperature control is delegated to subordinate PID controllers (with their own internal CPUs) to turning heaters on and off to maintain a target temperature. Controllers 1220 or 1230 may send target temperature signals to temperature controllers. Furthermore, in many arrangements, controllers 1220 or 1230 also monitor current temperatures for display to a user and to programmatically ensure attainment of extruder and bed temperatures before attempting to proceed with a build.

Temperature controls by electrical connections are represented by extruder temps 1260 and bed/chamber temps 1262, the latter being the temperature of the build surface (aka 'bed') and the temperature of the entire enclosure 110 shown in FIG. 1.

Yet other peripherals 1264 may be controlled by processing entities within ecosystem 1202, such as cooling fans, pellet agitators, lights, interlocks, and the like.

Another class of component subject to control of one or more processors shown is represented by tool head controller 1270 and subtending axis drivers, Theta1 drive 1272, Theta2 drive 1274 and spindle motor drive 1276. This depiction is hypothetical. The actual quantity and names of the axes applicable to a given tool head with its self-contained motion system may vary depending on design. An example of such a subsystem tool head is presented as tool head 262 in FIG. 3.

Connection 1277 represents a connection to any of the processes within ecosystem 1202 that can instruct the tool head to act upon a given sets of coordinates. Tool head controller 1270 may be likened to the role that controller 1220 plays in coordinating the actions of the XYZ axes drives as described above. Tool head controller 1270 may be of a proprietary type compatible with drivers 1272, 1274 and 1276 and programmed in view of the geometry and physical characteristics of the tool head components, operating as a self-contained packaged tool head 1275. Controller 1270 may even be located 'on-board' with the tool head hardware that becomes attached to carriage 252. Once installed in system 100, the controller 1270 acts as the gateway interface and mediator for commands from other entities directed to moving the tool head arm. Controller 1270 may be commanded by controller 1220, especially if some movements of the tool head are to be executed 'in lock step' with movements in XYZ. Tool head 1275 may have its own limit switches or position encoders, and its own axes initialization and homing procedures. Controller 1270 may be instructed from an external controller to perform its on-board homing and communicate back when completed.

In the preceding description, various exemplary embodiments have been described with reference to the accompanying drawings. It will be evident, however, that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. In a robotic manufacturing system, a sensing device for establishing positional relationships among a plurality of movable components within the system by detecting contact with movable components approaching from at least two directions comprising:
   a first contact-sensing surface configured to cause an output signal of the sensing device to change state when a movable tool, approaching from a first direction of approach, makes contact with the first contact-sensing surface; and
   a second contact-sensing surface configured to cause an output signal of the sensing device to change state when a movable tool, approaching from a second direction of approach that is orthogonal to the first direction, makes contact with the second contact-sensing surface.

2. The sensing device of claim 1 wherein the first contact-sensing surface comprises an electrical switch configured to actuate by a force applied by the movable tool to the first contact-sensing surface.

3. The sensing device of claim 1 wherein the first direction of approach is along a substantially vertical axis with respect to gravity and wherein a weight of the first contact-sensing surface is supported by force-applying member opposing a force of gravity sufficiently that the weight of the first contact-sensing surface alone does not cause the output signal to indicate contact with the first contact-sensing surface.

4. The sensing device of claim 1 wherein the second contact-sensing surface comprises an electrically conductive surface connected to complete an electrical circuit through contact with the movable tool.

5. The sensing device of claim 1 wherein the first contact sensing surface and the second contact sensing surface are integrated into a single structure.

6. The sensing device of claim 5 wherein the single structure is formed as a cylinder and the sensing device is configured and oriented with the first direction of approach being substantially axial with respect to the cylinder and the second direction of approach being substantially radial with respect to the cylinder.

7. In a system comprising a motion control system for moving tool tips into specific positions as described by a combination of coordinate values along a plurality of mutually orthogonal axes, a method, executed at least in part by a controller directing the motion control system, for determining an offset between at least one tool tip and a reference location associated with a contact sensor comprising:

(a) moving the tool tip to a first initial position at which the tool tip is not contacting the contact sensor and to specific coordinate of a first axis such that contact between the tool tip and the contact sensor can be achieved by further motion in at least one axis other than the first axis;

(b) moving the tool tip from the first initial position towards the contact sensor in a first direction, by motion in at least one second axis, until the contact sensor detects contact with the tool tip;

(c) recording at least one second coordinate value corresponding to a position, along the at least one second axis, of the tool tip upon contact with the contact sensor;

(d) moving the first tool tip to a second initial position at which the tool tip is not contacting the contact sensor and to the specific coordinate of the first axis such that contact between the tool tip and the contact sensor can be achieved by further motion in at least one axis other than the first axis, the second position being substantially opposite in direction, with respect to the contact sensor, from the first initial position;

(e) moving the first tool tip in a second direction towards the contact sensor until the contact sensor detects contact with the tool tip;

(f) recording at least one third coordinate value corresponding to a position, along the at least one second axis, of the tool tip upon contact with the contact sensor while moving from the second initial position;

(g) determining an offset value for the tool tip relative to the contact sensor by calculating an average between the second coordinate value and the third coordinate value.

8. The method of claim 7 further comprising:
obtaining data as to a known physical dimension of the contact sensor; and
calculating at least one physical dimension of the tool tip by subtracting the known physical dimension of the contact sensor from a distance between the second coordinate and third coordinate.

9. The method of claim 7 further comprising:
performing steps (a) through (g) with a first tool tip to determine a first offset between the sensor and the first tool tip;
performing steps (a) through (g) with a second tool tip to determine a second offset between the sensor and the second tool tip; and
calculating a differential offset between the first tool tip and the second tool tip based on a difference between the first offset and the second offset.

10. In a motion control system configured to create relative motion between multiple parts of the system as controlled by a computer, an apparatus, to be coupled to a first part for detecting proximity to a second part, comprising:

a contact sensing element;
a movable contact probe coupled to the contact sensing element;
an actuator, controlled by the computer, mechanically coupled to apply a deploying force to move the contact probe from an idle position to a deployed position;
wherein the contact sensing element is configured to detect when a contact force due to contact with the second part, causes displacement of the contact probe by exceeding the deploying force and wherein the actuator is configured to provide a variable deploying force.

11. The apparatus of claim 10 wherein the actuator comprises an outer housing and an inner member moved by influx of a fluid into the outer housing under pressure and wherein an amount of pressure applied to the fluid affects the deploying force.

12. The apparatus of claim 11 wherein the computer controls a valve which allows the entry of fluid under pressure to the outer housing.

13. The apparatus of claim 11 wherein the computer controls the amount of pressure applied to the fluid entering the actuator to force the contact probe into the deployed position.

14. The apparatus of claim 11 wherein the computer monitors the amount of pressure applied to the fluid entering the actuator to force the contact probe into the deployed position.

* * * * *